United States Patent
Poisner

(10) Patent No.: US 10,576,378 B2
(45) Date of Patent: Mar. 3, 2020

(54) NON-LINEAR INTERACTIVE EXPERIENCE CREATION AND EXECUTION METHODS AND SYSTEMS

(71) Applicant: Intel Corporation, Santa Clara, CA (US)

(72) Inventor: David I. Poisner, Carmichael, CA (US)

(73) Assignee: Intel Corporation, Santa Clara, CA (US)

( * ) Notice: Subject to any disclaimer, the term of this patent is extended or adjusted under 35 U.S.C. 154(b) by 282 days.

(21) Appl. No.: 15/252,124

(22) Filed: Aug. 30, 2016

(65) Prior Publication Data
US 2018/0056191 A1    Mar. 1, 2018

(51) Int. Cl.
| | |
|---|---|
| A63F 13/63 | (2014.01) |
| G06F 3/147 | (2006.01) |
| A63F 13/27 | (2014.01) |
| G06F 3/14 | (2006.01) |
| A63F 13/21 | (2014.01) |
| A63F 13/25 | (2014.01) |

(52) U.S. Cl.
CPC .............. *A63F 13/63* (2014.09); *A63F 13/21* (2014.09); *A63F 13/25* (2014.09); *A63F 13/27* (2014.09); *G06F 3/147* (2013.01); *G06F 3/1423* (2013.01); *G06F 3/1454* (2013.01); *A63F 2300/6009* (2013.01)

(58) Field of Classification Search
CPC .................................................. G06F 3/04815
See application file for complete search history.

(56) References Cited

U.S. PATENT DOCUMENTS

| | | | |
|---|---|---|---|
| 9,055,066 B2 | 6/2015 | Kim et al. | |
| 2015/0174478 A1 | 6/2015 | Barak | |
| 2017/0307888 A1* | 10/2017 | Kohler | ................... G06T 19/006 |
| 2018/0043249 A1* | 2/2018 | Linder | ................... A63F 13/211 |
| 2018/0059898 A1* | 3/2018 | Miller | ................. G06F 3/04815 |

OTHER PUBLICATIONS

Google, "Real-Time Multiplayer" retrieved on Aug. 30, 2016, 8 pages, https://developers.google.com/games/services/common/concepts/realtimeMultiplayer.

(Continued)

*Primary Examiner* — Robert T Clarke, Jr.
(74) *Attorney, Agent, or Firm* — Schwabe, Williamson & Wyatt, P.C.

(57) ABSTRACT

Methods, apparatus, and system create and execute non-linear interactive programs comprising action stages. During creation of a non-linear interactive program, output devices do not need to be known in advance, but can be defined according to output device criteria. Based on output devices encountered during execution of a non-linear interactive program, input which may be received from the output devices is determined, as well as input-output criteria. When input is received and input-output criteria are satisfied, output may be produced. In this way, execution of the non-linear interactive program may unfold, adaptively, based on participating output devices and input provided by such devices.

11 Claims, 11 Drawing Sheets

(56) References Cited

OTHER PUBLICATIONS

Rajesh Bose et al., "A new approach in mobile gaming on cloud-based architecture using Citrix and VMware technologies," Brazilian Journal of Science and Technology, Nov. 12, 205, 14 pages, retrieved on Aug. 30, 2016, http://bjst-journal.springeropen.com/articles/10.1186/s40552-015-0012-1.

Shaoxuan Wang et al., "Modeling and Characterizing User Experience in a Cloud Server Based Mobile Gaming Approach," Nov. 30, 2009-Dec. 4, 2009, 7 page, University of California, San Diego.

* cited by examiner

NON-LINEAR INTERACTIVE EXPERIENCE CREATION AND EXECUTION METHODS AND SYSTEMS

FIELD

The present disclosure relates to a computing device, in particular to, creation and execution of adaptive non-linear interactive experiences.

BACKGROUND

"Escape Rooms" are physical adventure games in which players are or appear to be locked or closed in a room or other confined space. Players solve puzzles and use items in the room to escape within a time limit.

The controlled space of an "Escape Room" requires time, energy, real estate and money to design and create. To the dismay of operators, players may damage the rooms in unanticipated ways during play.

"Interactive media" generally refers to products and services which respond to a user's actions to generate and present content such as text, images (including moving images), and audio. Interactive media can be "non-linear", in that it does not have a fixed story line or sequence of events; the story line or sequence of events is determined by the interaction of user input with digital objects in the interactive media. Video games are an example of non-linear interactive media.

Figure 1:
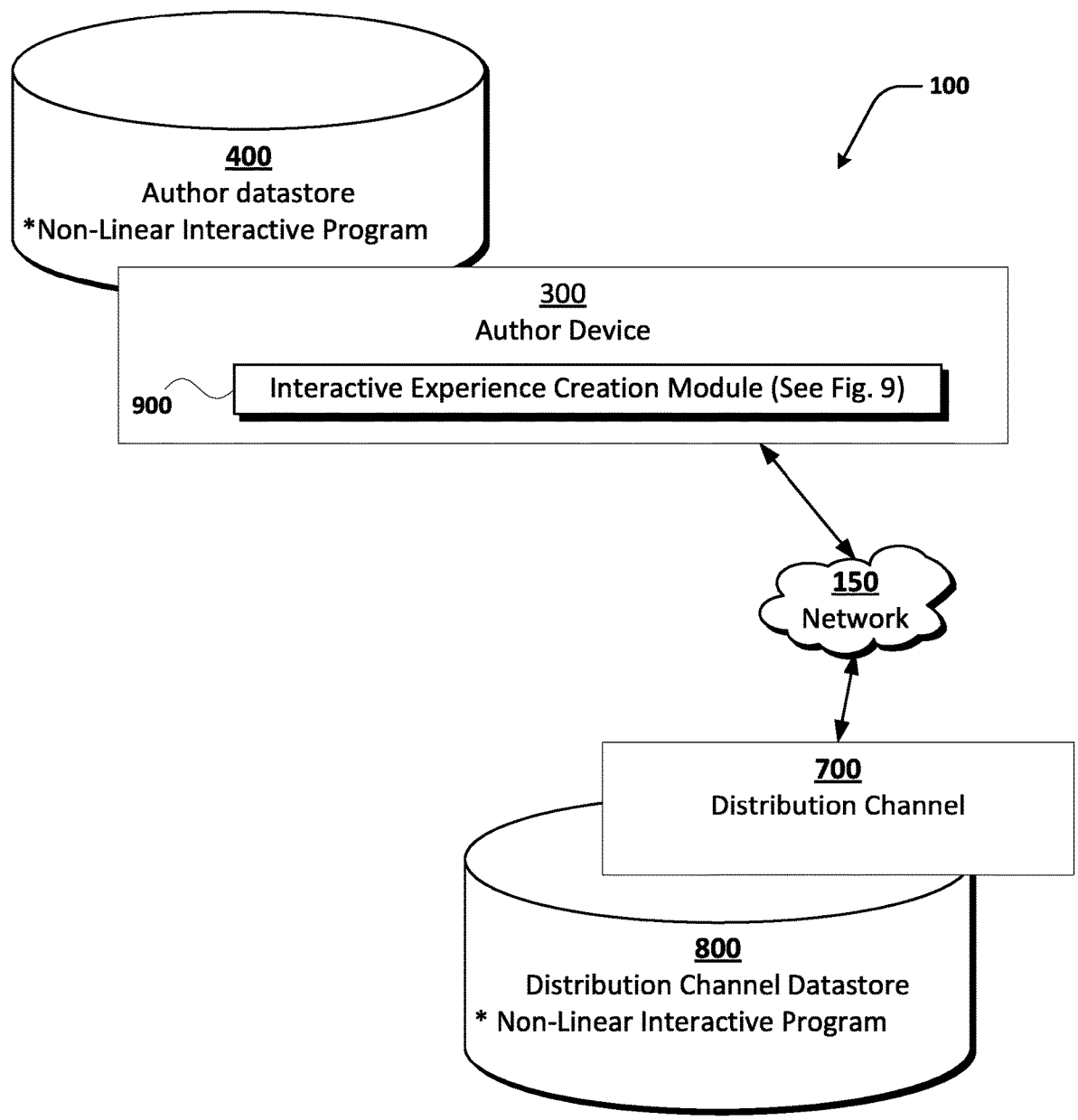
FIG. 1 is a network and device diagram illustrating an example of an authoring device for authoring a non-linear interactive experience and a distribution channel for distributing the non-linear interactive experience in a network environment incorporated with teachings of the present disclosure, according to some embodiments.

Although the following Detailed Description will proceed with reference being made to illustrative embodiments, many alternatives, modifications, and variations thereof will be apparent to those skilled in the art.

DETAILED DESCRIPTION

Following are defined terms in this document.

As used herein, the term "module" (or "logic") may refer to, be part of, or include an Application Specific Integrated Circuit (ASIC), a System on a Chip (SoC), an electronic circuit, a processor (shared, dedicated, or group) and/or memory (shared, dedicated, or group) or in another computer hardware component or device that execute one or more software or firmware programs having executable machine instructions (generated from an assembler and/or a compiler) or a combination, a combinational logic circuit, and/or other suitable components with logic that provide the described functionality. Modules may be distinct and independent components integrated by sharing or passing data, or the modules may be subcomponents of a single module, or be split among several modules. The components may be processes running on, or implemented on, a single compute node or distributed among a plurality of compute nodes running in parallel, concurrently, sequentially or a combination, as described more fully in conjunction with the flow diagrams in the figures.

As used herein, a process corresponds to an instance of an application executing on a processor and a thread corresponds to a portion of the process. A processor may include one or more execution core(s). The processor may be configured as one or more socket(s) that may each include one or more execution core(s).

In overview, this disclosure relates to methods and systems to author non-linear interactive programs, as well as methods and systems to execute non-linear interactive programs.

Developers, or "authors", create non-linear interactive programs. Each non-linear interactive program comprises one or more "steps", "levels" or "action stages". Action stages comprise input, output, input-output criteria, and output device selection criteria. A "coordinator" or the like may execute a non-linear interactive program.

Some output of a non-linear interactive program may be provided unconditionally—such as an image which is rendered by a projector or on any available output device whenever an interactive program is executing—while other output may be conditioned on receipt of input. Output may have a purely aesthetic function in a non-linear interactive program, such as fog from a fog machine, a colored light, or a projected (or rendered) image or rendered sound. Output may also or alternatively communicate or be part of a challenge of an action stage, such as a riddle, puzzle, or electronically locked physical device. Output may also or alternatively implement or communicate the solution of a challenge of an action stage, such as an output which unlocks a door, an earned point, and/or a goal completion status. Examples of output include text, audio or video content, a 2-dimensional print, 3-dimensional print, activation of actuators via a peripheral device control, lights, activation of communication links, award of earned points, public recognition or posting of earned points, entry into public, semi-public, or private contests, an executable software program, a deactivation of a player computer, a pause, a goal completion, and/or the activation of other action stage(s).

Unlike Escape Rooms and electronic games, which are highly controlled physical or logical spaces, the devices used to render or output the output of non-linear interactive programs do not have to be deterministically established by the author and then implemented in the environment. Instead, the author creates output device selection criteria. The output device selection criteria are used during execution of the non-linear interactive program to select output devices to output or render the output.

Output devices may include i) a coordinating device, wherein the coordinating device is to coordinate execution of a runtime instance of the non-linear interactive program, ii) a backup coordinating device, wherein the backup coordinating device is to coordinate the runtime instance of the non-linear interactive program when the coordinating device is unavailable, iii) a purchaser, wherein the purchaser is to provide consideration to obtain the non-linear interactive program, iv) a player, wherein the player is to play the runtime instance of the non-linear interactive program under the coordination of the coordinator (which play may include rendering output and providing input), and/or v) a peripheral device, wherein the peripheral device renders output and/or provides input, but is not necessarily used by a user, participant, or player of the non-linear interactive experience.

Examples of output device selection criteria comprise a random selection among a group of available output devices, a selection by a coordinating device or a backup coordinating device among available output devices, a self-selection by a user of the output device, a selection of an output device based on at least one of a location of the output device, a display characteristic of the output device, a processing power of the output device, a goal completion status of a user of the output device, a payment, a participant role of a user of the output device, a battery life of the output device, an availability of non-battery power to the output device, an output device most recently added during the runtime instance of the non-linear interactive program, or an output device most heavily used during the runtime instance of the non-linear interactive program.

The output devices during an execution of a runtime instance of a non-linear interactive program may be variable and not all output devices can render or output all of the potential output; therefore, the set of actual output (and of input-output criteria) may be determined at runtime of a non-linear interactive program, according to the output device selection criteria and what output devices are participating in an instance of the non-linear interactive program. Therefore, execution of the non-linear interactive program will be different, depending on the available output devices. For example, certain output of a non-linear interactive program, such as a display of a map, may require a particular screen in a geographic location, or a screen with a minimum size, or a minimum resolution output. If output devices with these requirements are not available or not present in the required location, the map display output may not be rendered. The author of the non-linear interactive program may have provided other output suited to a mobile phone with a video camera, such as directional arrows overlaid on the mobile phone's display of video camera output, wherein the directional arrows tell the user where to go. The direction arrows do not need to follow the same route as might be followed pursuant to the map and may lead to different clues and a different puzzle, so these two different instances of the same non-linear interactive program may be very different.

Players of a non-linear interactive program may provide input to trigger conditional output, demonstrate that they have solved the puzzle of an action stage, met the challenge of an action stage, etc. Examples of input include text values, speech or voice input values, image input, touch input, actuator input, a location of a device input, an orientation of a device, output from a programmed electronic device (such as a device controlled by an ARDIUNO® microcontroller), and images or other input in relation to non-electronic artifacts. Examples of non-electronic artifacts include construction toys (such as LEGO® construction toys) arranged in a pattern, drawings on media (paper, sand, etc.), codes, images, text strings and the like printed on paper, 3D printed objects, and the like. Non-electronic artifacts may be an output produced in response to a previous input. Image processing, audio recognition and the like may be performed with respect to non-electronic artifacts to convert them into input.

Certain of the input to trigger an output may require satisfaction of additional criteria, referred to herein as "input-output criteria". Input-output criteria are set by the author and may vary with action stage. Examples of input-output criteria comprise input that may need to be provided by more than one player, such as a set of players being within a distance of each other, a set of players arranged or oriented in a pattern within a time period, a sequence of input (or a sequence of input-output interactions) which must be received (or which occur) in a particular order, or the like.

Authors may also specify how a player device or another device used by a participant role may be deactivated with respect to a non-linear interactive program. Examples include, self-deactivation, failing to complete an action stage within a period of time or with specified input, moving beyond a specified distance from a location or other players, being in a specified location, or according to other criteria which the author may specify. These may be forms of input received by the coordinator during execution of the non-linear interactive program.

A non-linear interactive program is generally described herein as being executed by a "coordinator"; execution may be delegated by the coordinator, such as to a backup coordinator and/or another device, such as distribution channel computer device. Execution of a non-linear interactive program may be by a local computer device, relative to an area of an action stage, or may be executed by a remote computer device. The coordinator discovers other devices willing to participate in the non-linear interactive experience, generally referred to as "players", and also discovers peripheral devices (which may be purchased, rented, or otherwise made available in exchange for consideration). The coordinator executes the output device selection criteria of the non-linear interactive program to determine the output which may be output or rendered by available devices; the output device selection criteria may also be used to determine input-output criteria which may apply to an action stage. The coordinator's execution of the non-linear interactive program may direct the output of unconditional output and may receive and process input from the players. The coordinator's execution of the non-linear interactive program may determine whether input-output criteria are satisfied and whether input produces an output. The coordinator's execution of the non-linear interactive program may respond to input by transmitting output(s) to output device(s) to be rendered or otherwise implemented. For example, the coordinator's execution of the non-linear interactive program may determine whether the output comprises a goal completion for an action stage and may update and implement scoring for players.

Player devices may join together to form teams or may play as individuals. A player, the coordinator, and/or another device may provide consideration for the non-linear interactive experience, whether before or after initiation of the non-linear interactive experience. Such a party may also be referred to herein as a "purchaser". Consideration may be provided to a party who hosts or otherwise provides access to non-linear interactive experiences, such party being referred to herein as a "distribution channel". A distribution channel may also provide backup services and may act as a backup coordinator and/or to determine a coordinator.

Therefore, a coordinator executes or begins execution of a non-linear interactive program, which may have been purchased by a purchaser from a distribution channel. Coordinator may determine entry of teams and/or individuals into the non-linear interactive program as well as the availability of peripheral devices. This may be automatically determined according to output device selection criteria processed by coordinator or it may involve active selection by coordinator. Selection of output devices based on output device selection criteria programmed into the non-linear interactive program may review reported output modalities of the players and peripherals available to the coordinator. Peripheral devices include audio and video displays, electronically controlled locks (which may be part of puzzles), lights, actuators, communication equipment and/or communication links, and the like. In this way, displays and other rending equipment in players and peripheral devices may be used to render clues, lock/unlock locks and to activate/deactivate actuators in an action stage of the non-linear interactive program.

Coordinator (potentially via a cloud-based service such as distribution channel) receives user input from players and non-user input (such as from peripherals). Input-output criteria are reviewed and the input is processed and may trigger output. Examples of output include another clue within the same action stage, a clue which prompts more user input, instructions to generate a non-electronic artifact, the output may be a score or a prize, or the output may allow one or more users to move on to the next action stage, or the output may suspend a player. Other examples of output are discussed herein.

In this way, authors of non-linear interactive programs do not have to determine all output devices which must be present before a non-linear interactive program may begin execution, but instead may program a range of output devices which may be present. Depending on the available output devices during a runtime instance of the non-linear interactive program, output and input-output criteria are determined, and the non-linear interactive program may be executed. Another example of execution of a non-linear interactive program is discussed in relation to FIG. 2.

In this way, non-linear interactive programs created and executed pursuant to this disclosure may be understood as adaptive non-linear interactive programs. In addition to being "adaptive" in the sense that all interactive media responds or "adapts" to differing user input, non-linear interactive programs created and executed pursuant to this disclosure are also adaptive at least in a sense of adapting output and input-output criteria to available output devices. With a sufficiently creative author, a single non-linear interactive program may have very different output and follow a very different progression in two different run-time instances in which different output devices are present.

FIG. 1 is a network and device diagram illustrating an example of an authoring computer device, author device 300, for authoring a non-linear interactive program and a distribution channel 700 for distributing the non-linear interactive program in a network environment incorporated with teachings of the present disclosure, according to some embodiments. Author device 300 is described and illustrated further in relation to FIG. 3. Distribution channel 700 is described and illustrated further in relation to FIG. 7. In overview, author device 300 and distribution channel 700 may be servers, workstation computers, desktop computers, laptop computers, tablet computers, mobile phones including, but not limited to a smart phone, (e.g., iPhone®, Android®-based phone, Blackberry®, Symbian®-based phone, Palm®-based phone, etc.), and/or other general purpose computing devices. Modules within these computers may be executed as services within or by other suitably capable computers.

Figure 9:
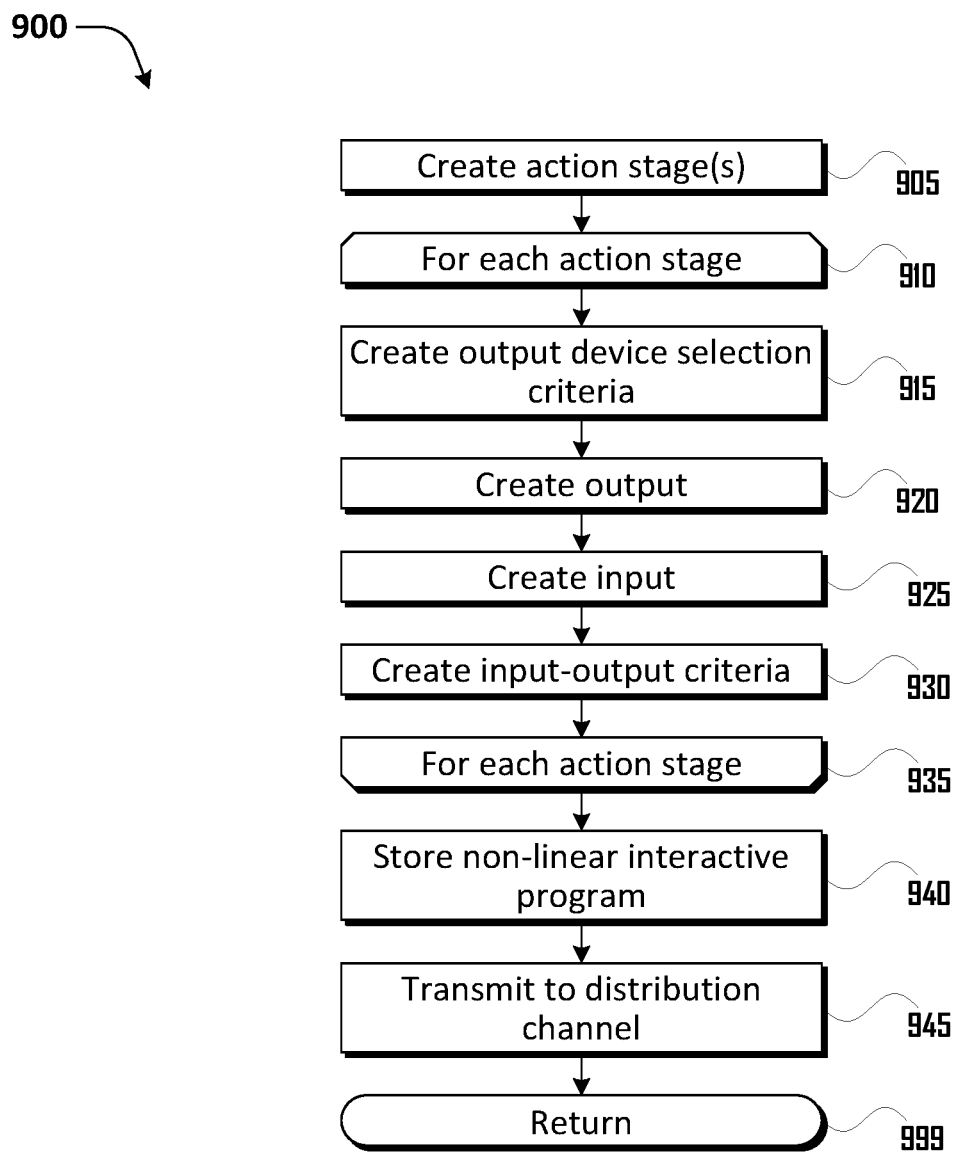
FIG. 9 is a flow diagram illustrating an example of and algorithmic structure for an interactive experience creation module, according to some embodiments.

As illustrated in FIG. 1, author device 300 may comprise interactive experience creation module 900, illustrated and discussed further in relation to FIG. 9. As illustrated in FIG. 1, author device 300 may comprise or be in communication with author datastore 400. Author datastore 400 may comprise records used by routines and modules of author device 300; in FIG. 1, non-linear interactive program is illustrated as an example of such a record.

Also illustrated in FIG. 1 is network 150. Network 150 may comprise computers, network connections among the computers, and software routines to enable communication between the computers over the network connections. Examples of network 150 comprise an Ethernet network, the Internet, and/or a wireless network, such as a GSM, TDMA, CDMA, EDGE, HSPA, LTE or other network provided by a wireless service provider. Connection to network 150 may be via a Wi-Fi connection. More than one network may be involved in a communication session between the illustrated devices. Connection to network 150 may require that the computers execute software routines which enable, for example, the seven layers of the OSI model of computer networking or equivalent in a wireless phone network.

Network 150 may be used for communication between author device 300 and distribution channel 700. Distribution channel 700 may be, for example, a third-party provider of computer processor and memory services. Distribution channel 700 may receive or obtain access to non-linear interactive program, created on or by author device 300, and may store non-linear interactive program (or access thereto) in distribution channel datastore 800. Use of distribution channel 700 is not required to host non-linear interactive program (this may be done directly by author device 300 or by another party), but may facilitate access to it.

Distribution channel 700 may provide other services, such as data backup services. Distribution channel 700 may also act as a coordinator or as a backup coordinator, to execute an instance of non-linear interactive program. In this way, if a coordinator is not available to execute a non-linear interactive program or if a coordinator drops out of an instance of a non-linear interactive program, the non-linear interactive program instance may be transferred to another coordinator, without loss of progress, via distribution channel 700.

Figure 2:
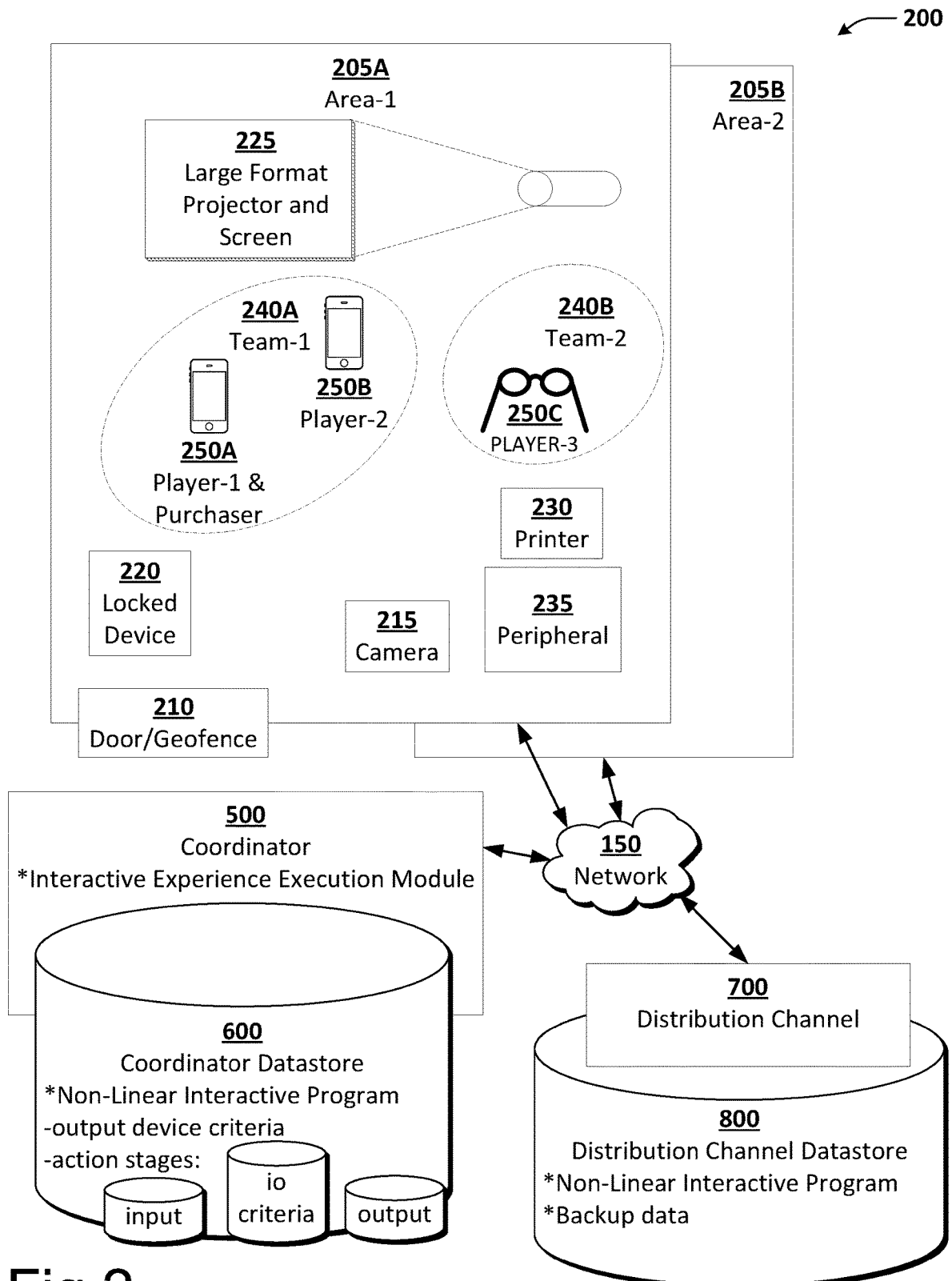
FIG. 2 is a network and device diagram illustrating an example of player devices playing a non-linear interactive experience in an area, under the coordination of a coordinator device in a network environment incorporated with teachings of the present disclosure, according to some embodiments.

FIG. 2 is a network and device diagram illustrating an example of player devices 250A and 250B in Team-1 240A and player device 250C in Team-2 240B (there may be other members of Team-2 240B) playing a non-linear interactive experience in an area-1 205A, under the coordination of a coordinator computer device 500 ("coordinator 500") in a network environment incorporated with teachings of the present disclosure, according to some embodiments. Coordinator 500 is described and illustrated further in relation to FIG. 5; coordinator datastore 600 is described and illustrated further in relation to FIG. 6. In overview, coordinator 500 may be a server, workstation computer, desktop computer, laptop computer, tablet computer, virtual reality computer, and/or mobile phone including, but not limited to a smart phone, (e.g., iPhone®, Android®-based phone, Blackberry®, Symbian®-based phone, Palm®-based phone, etc.), and/or another general purpose computer device. In general, player devices, including player-1 250A, player-2 250B, and player-3 250C, may be general purpose computing devices. They may, though are not required, have a form factor which allows mobility by a user of the player device. Examples of player device include laptop computers, tablet computers, augmented reality computer devices (including wearable devices, such as Google Glass™, use of mobile phones to augment video output with overlaid images, and the like), virtual reality computer devices (including Oculus Rift® and the like), and/or mobile phones including, but not limited to smart phones. However, as noted, player devices are not required to have a mobility form factor and may be general purpose computers with limited mobility, such as servers, workstation computers, desktop computers, and the like.

In the example illustrated in FIG. 2, player-1 250A and player-2 250B have formed team-1 240A; player-3 250C and other players (not illustrated) have formed team-2 240B. By way of example, player-1 250A and player-2 250B are illustrated in FIG. 2 as mobile phones, while player-3 is illustrated as an augmented reality wearable device. The two teams may be competing to see which team can first escape from area-1205A, such as out of door/geofence 210. In the example illustrated in FIG. 2, player-1 250A may also be a purchaser, who has purchased or otherwise provided consideration for a non-linear interactive program. This transaction may have been performed between player-1 250 and distribution channel 700.

In FIG. 2, coordinator 500 may be present in area-1 205A or may be in a remote location. Coordinator 500 is illustrated and discussed further in FIG. 5. As illustrated in FIG. 2, coordinator 500 comprises interactive experience execution module; interactive experience execution module is discussed and illustrated further in FIGS. 10A and 10B. Coordinator 500 is further illustrated in FIG. 2 as comprising or being in communication with coordinator datastore 600. Coordinator datastore 600 is illustrated as comprising records used by routines or modules, such as, for example, non-linear interactive program. As illustrated in FIG. 2, non-linear interactive program comprises output device criteria and action stages. As illustrated in FIG. 2, the action stages comprise input, input-output criteria, and output.

In the example illustrated in FIG. 2, a first action stage may comprise output device criteria which require that player devices be in area-1 205A; leaving area-1 205A before completion of the first action stage may produce output from the player devices, which output may be input to interactive experience execution module executed by coordinator 500, which input may cause output of disqualification of a player device or a team. When completed, the first action stage may lead to a second or subsequent action stage (action stages may follow a logical order, determined by availability of output devices, output device criteria, completion of other action stages, and the like). The second action stage may, for example comprise output device criteria which require that player devices be in area-2 205B. Multiple action stages may be executed simultaneously, with multiple devices in each area.

The areas in FIG. 2 (area-1 205A and area-2 205B) may be buildings or rooms, in which case the solid line around area-1205A may be interpreted as a wall or the like. The areas in FIG. 2 may also and/or alternatively be areas not constrained by a physical wall, but may be geographic areas constrained by a perimeter, geofence, or the like. Action stages do not need to be confined to an area.

In FIG. 2, the then-current action stage being played by player-1 250A and player-2 250B may comprise output which is rendered or output via output devices, such as for example, player-1 250A, player-2 250B, player-3 250C and peripherals. Examples of peripherals in FIG. 2 include large format projector and screen 225, printer 230, locked device 220, door/geofence 210, and peripheral 235. Peripheral 235 may also include a sensor, including a sensor which detects the presence, location, and movement of objects, detects an environmental condition, maps a space in 2- or 3-dimensions, or the like. For example, peripheral 235 may be a motion sensor, as are found in Kinect™, Wii® devices, and the like. The players and peripherals may communicate with each other and/or network 150 (including via network equipment, not illustrated, which may exist between the peripherals and network 150) through wireline (such as Ethernet or the like) or wireless communication media (such as WiFi, LTE, BlueTooth®, visible light communication, or the like).

For example, a text, image, or other puzzle may be output on one or both player-1 250A and player-2 250B, an augmented reality "bird" may fly through the field of view of player-3 250C (which the user thereof is intended to or may follow to find a clue), while a map is output via large format projector and screen 225. Locked device 220 may be an object which is opened, for example, when a set of players on the same team solve a puzzle. The solved puzzle is provided as input to coordinator 500; input-output criteria of the action stage may require that more than one player solve the puzzle within a time period and that they be on the same team or that a sequence of input be received (including input-output sequences). Output generated by the input may unlock locked device 220. When unlocked, locked device 220 may reveal instructions regarding how to print a barcode, a matrix barcode, a 3-dimensional object, or the like, using printer 230. Players may then take a photo of the output of printer 230, for example, using camera 215 (or a camera in one of the smartphones of player-1 250A, player-2 250B, and/or player-3 250C). The photo from camera 215 may then be input which is processed by interactive experience execution module and coordinator 500 to produce other output, such as completion of the action stage, unlocking of door/geofence 210, or the like.

Other input and input-output criteria may apply to the same or a different action stage. For example, an input-output criteria may require input from five players, with the input being that the players (or non-cooperating players or peripherals) stand in a pattern (which may be communicated by sensor information from the player devices). For example an input-output criteria in relation to a particular input may require that other input be received first or that a sequence of input and output be followed before the particular input will produce an intended (or hoped for) output.

During play of non-linear interactive program, distribution channel 700 may provide services such as, for example, selling, renting, licensing, otherwise making non-linear interactive program available to coordinator 500 and the players. Distribution channel 700 may also store backup data, such as, for example, input data from players, output, scores, and the like. If coordinator 500 drops out, a backup coordinator may be identified, such as among the players, and/or distribution channel 700 may act as a temporary/permanent replacement coordinator.

Figure 3:
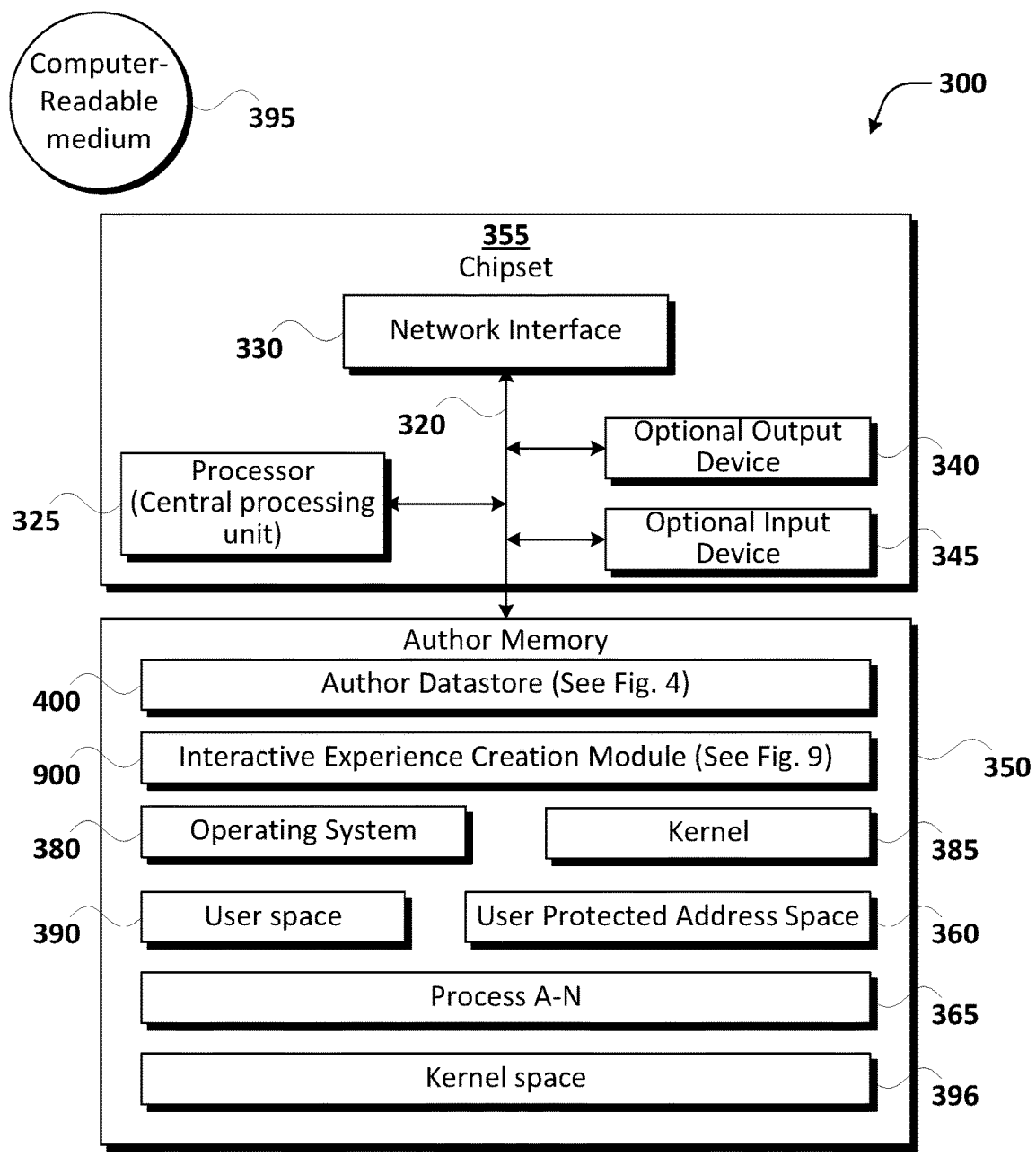
FIG. 3 is a functional block diagram illustrating an example of an author device incorporated with teachings of the present disclosure, according to some embodiments.

FIG. 3 is a functional block diagram illustrating an example of author device 300 incorporated with the teachings of the present disclosure, according to some embodiments. Author device 300 may include chipset 355, comprising processor 325, input/output (I/O) port(s) and peripheral devices, such as output 340 and input 345, and network interface 330, and author memory 350, all interconnected via bus 320. Network Interface 330 may be utilized to form connections with network 150, with author datastore 400, or to form device-to-device connections with other computers.

Chipset 355 may include communication components and/or paths, e.g., buses 320, that couple processor 325 to peripheral devices, such as, for example, output 340 and input 345, which may be connected via I/O ports. For example, chipset 355 may include a peripheral controller hub (PCH). In another example, chipset 355 may include a sensors hub. Input 345 and output 340 may include, for example, user interface device(s) including a display, a touch-screen display, printer, keypad, keyboard, etc., sensor(s) including accelerometer, global positioning system (GPS), gyroscope, etc., communication logic, wired and/or wireless, storage device(s) including hard disk drives, solid-state drives, removable storage media, etc. I/O ports for input 345 and output 340 may be configured to transmit and/or receive commands and/or data according to one or more communications protocols. For example, one or more of the I/O ports may comply and/or be compatible with a universal serial bus (USB) protocol, peripheral component interconnect (PCI) protocol (e.g., PCI express (PCIe)), or the like.

Author memory 350 may generally comprise a random access memory ("RAM"), a read only memory ("ROM"), and a permanent mass storage device, such as a disk drive or SDRAM (synchronous dynamic random-access memory). Author memory 350 may store program code for software modules or routines, such as, for example, interactive experience creation module 900 (illustrated and discussed further in relation to FIG. 9).

Author memory 350 may also store operating system 380. These software components may be loaded from a non-transient computer readable storage medium 395 into author memory 350 using a drive mechanism associated with a non-transient computer readable storage medium 395, such as a floppy disc, tape, DVD/CD-ROM drive, memory card, or other like storage medium. In some embodiments, software components may also or instead be loaded via a mechanism other than a drive mechanism and computer readable storage medium 395 (e.g., via network interface 330).

Author memory 350 is also illustrated as comprising kernel 385, kernel space 396, user space 390, user protected address space 360, and author datastore 300 (illustrated and discussed further in relation to FIG. 3).

Author memory 350 may store one or more process 365 (i.e., executing software application(s)). Process 365 may be stored in user space 390. Process 365 may include one or more process 365a . . . 365n. One or more process 365 may execute generally in parallel, i.e., as a plurality of processes and/or a plurality of threads. Process 365 corresponds to one example of an executing software application, such as, for example, interactive experience creation module 900. Process 365 may be executed as a plurality of threads.

Author memory 350 is further illustrated as storing operating system 380 and/or kernel 385. The operating system 380 and/or kernel 385 may be stored in kernel space 396. In some embodiments, operating system 380 may include kernel 385. One or more process 365 may be unable to directly access kernel space 396. In other words, operating system 380 and/or kernel 385 may attempt to protect kernel space 396 and prevent access by certain of process 365a . . . 365n.

Kernel 385 may be configured to provide an interface between user processes and circuitry associated with author device 300. In other words, kernel 385 may be configured to manage access to processor 325, chipset 355, I/O ports and peripheral devices by process 365. Kernel 385 may include one or more drivers configured to manage and/or communicate with elements of author device 300 (i.e., processor 325, chipset 355, I/O ports and peripheral devices).

Figure 4:
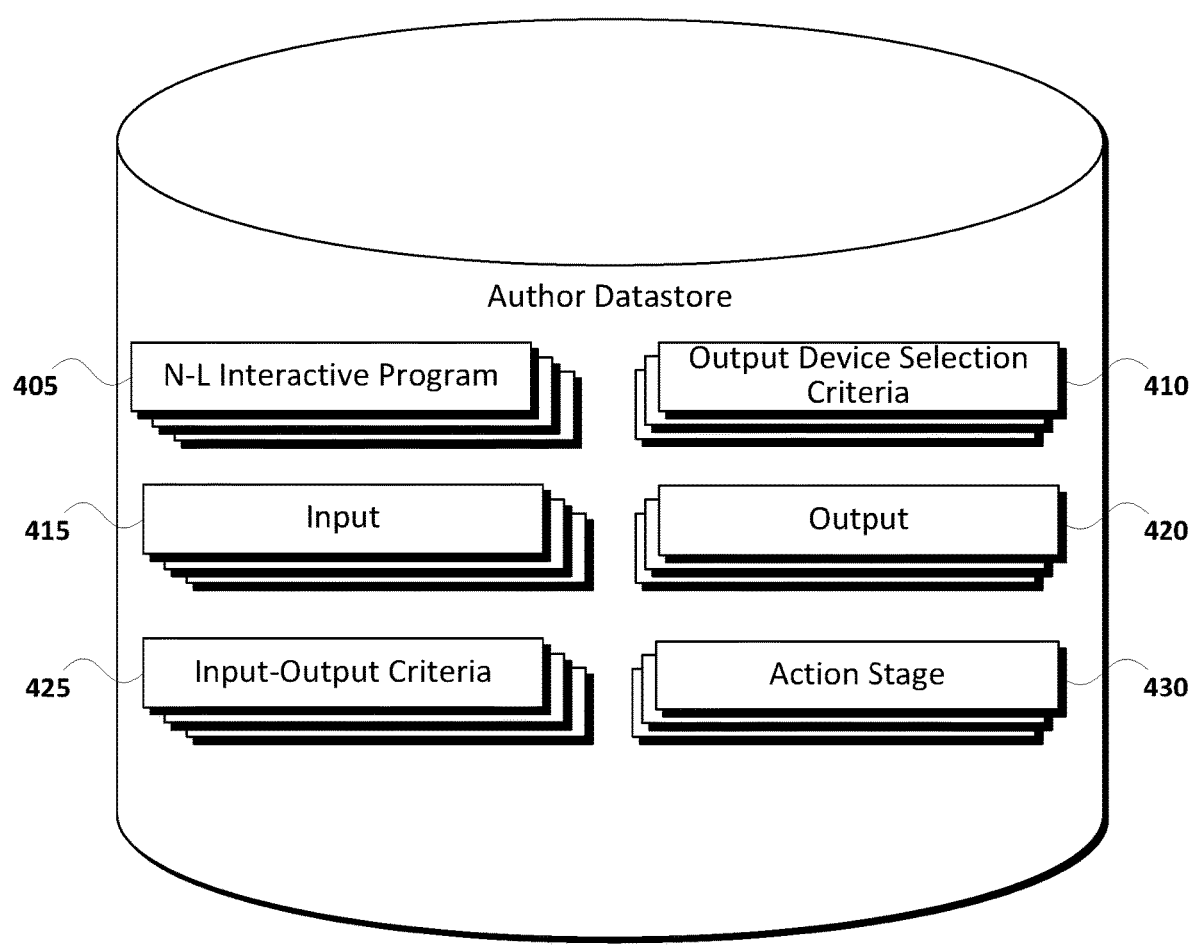
FIG. 4 is a functional block diagram illustrating an example of an author datastore for practicing the present disclosure, consistent with embodiments of the present disclosure.

Author device 300 may also comprise or communicate via Bus 320 with author datastore 400, illustrated and discussed further in relation to FIG. 4. In various embodiments, bus 320 may comprise a storage area network ("SAN"), a high speed serial bus, and/or via other suitable communication technology. In some embodiments, author device 300 may communicate with author datastore 400 via network interface 330. Author device 300 may, in some embodiments, include many more components than as illustrated. However, it is not necessary that all components be shown in order to disclose an illustrative embodiment.

FIG. 4 is a functional block diagram of the author datastore 400 illustrated in the author device of FIG. 3, according to some embodiments. The components of author datastore 400 may include data groups used by modules and/or routines, e.g, non-linear interactive program 405, output device selection criteria 410, input 415, output 420, and input-output criteria 425 (to be described more fully below). The data groups used by modules or routines illustrated in FIG. 4 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, references to other database entries, joins, conditional logic, tests, and similar. The components of author datastore 400 are discussed at great length further herein in the discussion of other of the Figures.

In overview, non-linear interactive program 405 comprises one or more records comprising an executable program created through the use of interactive experience creation module 900.

Output device selection criteria 410 comprise one or more records used during execution of the non-linear interactive program to select output devices to output or render output. Examples of output device selection criteria 410 are provided elsewhere, herein.

Input 415 is so-called from the perspective of author device 300 and/or coordinator 500 (output by a player device may be viewed as input by author device and/or by coordinator 500). Generally, players of a non-linear interactive program may provide input to coordinator to trigger conditional output, to demonstrate that they have solved the puzzle of an action stage, to meet the challenge of an action stage, etc. Input 415 records define input to coordinator 500 (or to another party executing non-linear interactive program 405), which input, if it occurs, may be associated with output 420. Examples of input are provided elsewhere, herein.

Output 420 is so-called from the perspective of author device 300 and/or coordinator 500. Output 420 records define responses to input 415. Output 420 may comprise content which is sent to and which may be rendered by an output device, as well as a response to input 415 which advances or at least relates to an action stage, such as a goal completion status.

Input-output criteria 425 are records which may set additional requirements in relation to received input in order to generate output. Examples of input-output criteria 425 are discussed further, herein.

Action stage 430 records comprise one or more action stages within a non-linear interactive program 405.

Figure 5:
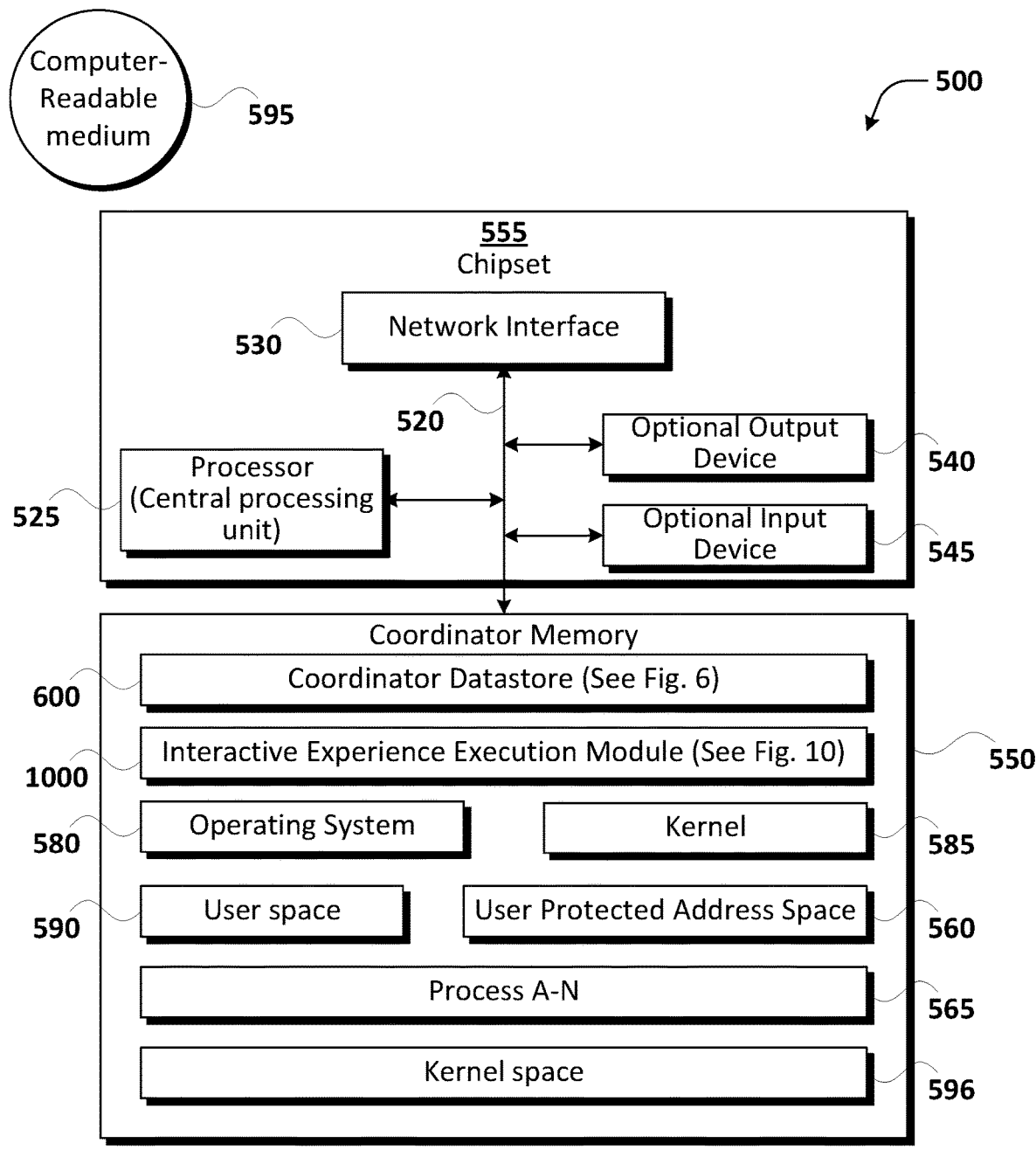
FIG. 5 is a functional block diagram illustrating an example of a coordinator device incorporated with teachings of the present disclosure, according to some embodiments.

FIG. 5 is a functional block diagram illustrating an example of coordinator 500 incorporated with the teachings of the present disclosure, according to some embodiments. Coordinator 500 may include chipset 555, comprising processor 525, input/output (I/O) port(s) and peripheral devices, such as output 540 and input 545, and network interface 530, and coordinator memory 550, all interconnected via bus 520. Network Interface 530 may be utilized to form connections with network 150, with coordinator datastore 600, or to form device-to-device connections with other computers.

Chipset 555 may include communication components and/or paths, e.g., buses 520, that couple processor 525 to peripheral devices, such as, for example, output 540 and input 545, which may be connected via I/O ports. For example, chipset 555 may include a peripheral controller hub (PCH). In another example, chipset 555 may include a sensors hub. Input 545 and output 540 may include, for example, user interface device(s) including a display, a touch-screen display, printer, keypad, keyboard, etc., sensor(s) including accelerometer, global positioning system (GPS), gyroscope, etc., communication logic, wired and/or wireless, storage device(s) including hard disk drives, solid-state drives, removable storage media, etc. I/O ports for input 545 and output 540 may be configured to transmit and/or receive commands and/or data according to one or more communications protocols. For example, one or more of the I/O ports may comply and/or be compatible with a universal serial bus (USB) protocol, peripheral component interconnect (PCI) protocol (e.g., PCI express (PCIe)), or the like.

Coordinator memory 550 may generally comprise a random access memory ("RAM"), a read only memory ("ROM"), and a permanent mass storage device, such as a disk drive or SDRAM (synchronous dynamic random-access memory). Coordinator memory 550 may store program code for software modules or routines, such as, for example, interactive experience execution module 1000 (illustrated and discussed further in relation to FIG. 10).

Coordinator memory 550 may also store operating system 580. These software components may be loaded from a non-transient computer readable storage medium 595 into coordinator memory 550 using a drive mechanism associated with a non-transient computer readable storage medium 595, such as a floppy disc, tape, DVD/CD-ROM drive, memory card, or other like storage medium. In some embodiments, software components may also or instead be loaded via a mechanism other than a drive mechanism and computer readable storage medium 595 (e.g., via network interface 530).

Figure 6:
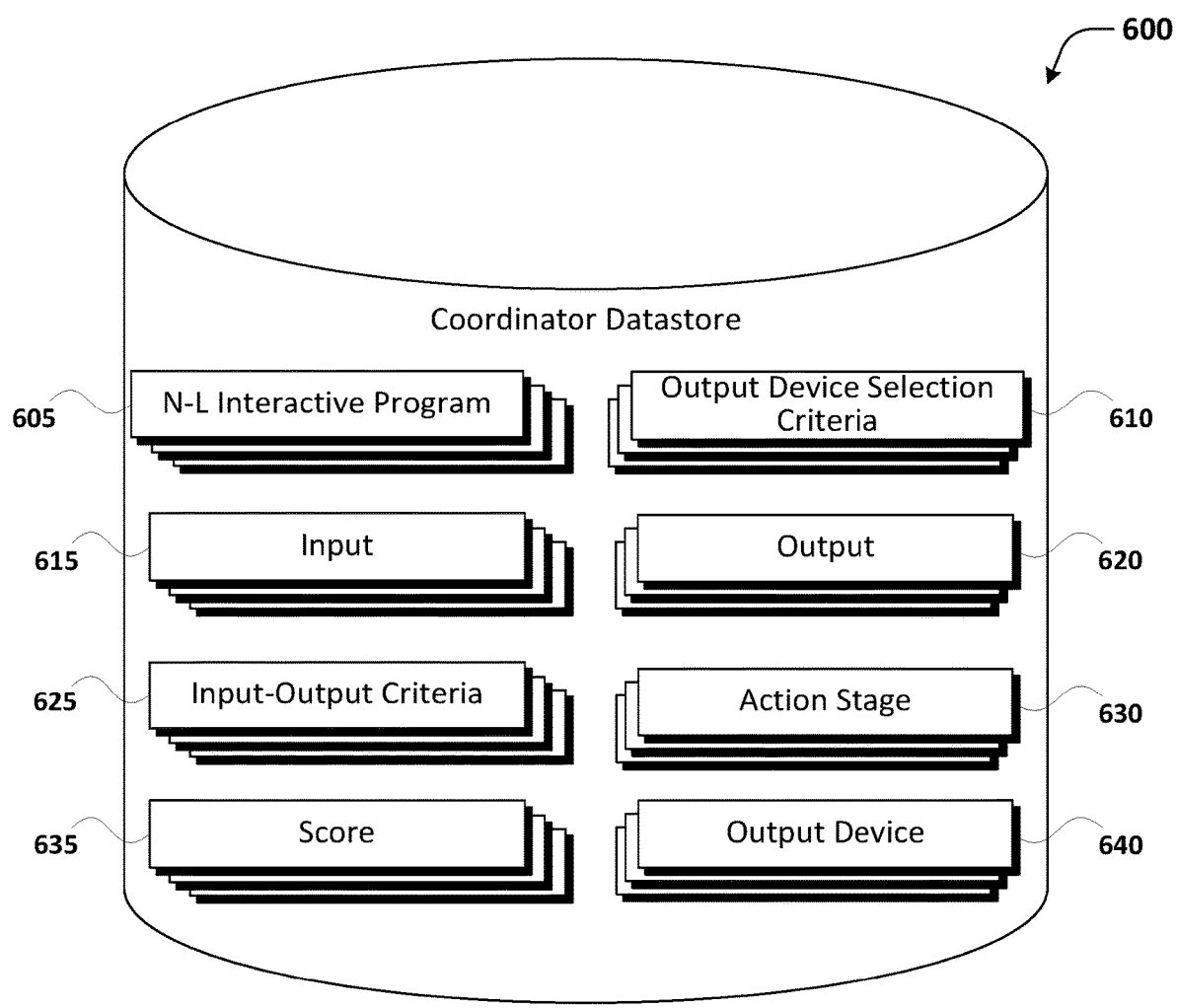
FIG. 6 is a functional block diagram illustrating an example of a coordinator datastore for practicing the present disclosure, consistent with embodiments of the present disclosure.

Coordinator memory 550 is also illustrated as comprising kernel 585, kernel space 596, user space 590, user protected address space 560, and coordinator datastore 600 (illustrated and discussed further in relation to FIG. 6).

Coordinator memory 550 may store one or more process 565 (i.e., executing software application(s)). Process 565 may be stored in user space 590. Process 565 may include one or more process 565a . . . 565n. One or more process 565 may execute generally in parallel, i.e., as a plurality of processes and/or a plurality of threads. Process 565 corresponds to one example of an executing software application, such as, for example, interactive experience execution module 1000. Process 565 may be executed as a plurality of threads.

Coordinator memory 550 is further illustrated as storing operating system 580 and/or kernel 585. The operating system 580 and/or kernel 585 may be stored in kernel space 596. In some embodiments, operating system 580 may include kernel 585. One or more process 565 may be unable to directly access kernel space 596. In other words, operating system 580 and/or kernel 585 may attempt to protect kernel space 596 and prevent access by certain of process 565a . . . 565n.

Kernel 585 may be configured to provide an interface between user processes and circuitry associated with coordinator 500. In other words, kernel 585 may be configured to manage access to processor 525, chipset 555, I/O ports and peripheral devices by process 565. Kernel 585 may include one or more drivers configured to manage and/or communicate with elements of coordinator 500 (i.e., processor 525, chipset 555, I/O ports and peripheral devices).

Coordinator 500 may also comprise or communicate via Bus 520 with coordinator datastore 600, illustrated and discussed further in relation to FIG. 6. In various embodiments, bus 520 may comprise a storage area network ("SAN"), a high speed serial bus, and/or via other suitable communication technology. In some embodiments, coordinator 500 may communicate with coordinator datastore 600 via network interface 530. Coordinator 500 may, in some embodiments, include many more components than as illustrated. However, it is not necessary that all components be shown in order to disclose an illustrative embodiment.

FIG. 6 is a functional block diagram of the coordinator datastore 600 illustrated in the author device of FIG. 5, according to some embodiments. The components of coordinator datastore 600 may include data groups used by modules and/or routines, e.g, non-linear interactive program 605, output device selection criteria 610, input 615, output 620, and input-output criteria 625 (to be described more fully below). The data groups used by modules or routines illustrated in FIG. 6 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, references to other database entries, joins conditional logic, tests, and similar. The components of coordinator datastore 600 are discussed at great length further herein in the discussion of other of the Figures.

In overview, non-linear interactive program 605 comprises one or more records comprising an executable program created through the use of interactive experience creation module 900. In coordinator 500, non-linear interactive program 605 may be received from, for example, distribution channel 700 and/or author device 300.

Output device selection criteria 610 comprise one or more records used during execution of the non-linear interactive program to select output devices to output or render output. Examples of output device selection criteria 610 are provided elsewhere, herein.

Input 615 is so-called from the perspective of coordinator 500 and/or coordinator 500 (output by a player device may be viewed as input by author device and/or by coordinator 500). Generally, players of a non-linear interactive program may provide input to trigger conditional output, demonstrate that they have solved the puzzle of an action stage, met the challenge of an action stage, etc. Input 615 records define input to coordinator 500 (or to another party executing non-linear interactive program 605), which input, if it occurs, may be associated with output 620. Examples of input are provided elsewhere, herein.

Output 620 is so-called from the perspective of coordinator 500 and/or coordinator 500. Output 620 records define responses to input 615. Output 620 may comprise content which is sent to and which may be rendered by an output device, as well as a response to input 615 which advances or at least relates to an action stage, such as a goal completion status.

Input-output criteria 625 are records which may set additional requirements in relation to received input in order to generate output. Examples of input-output criteria 625 are discussed further, herein.

Action stage 630 records comprise one or more action stages within a non-linear interactive program 605.

Score 635 records comprise score entries in relation to players. Score entries may be earned, for example, when a player provides input which is associated with a goal completion, including a goal completion for an action stage.

Output device 640 records may comprise entries of output devices which have elected to participate in, which have been selected following processing of output device selection criteria 610 records during execution of a non-linear interactive program, or which are otherwise available during execution of a non-linear interactive program (such as peripherals).

Figure 7:
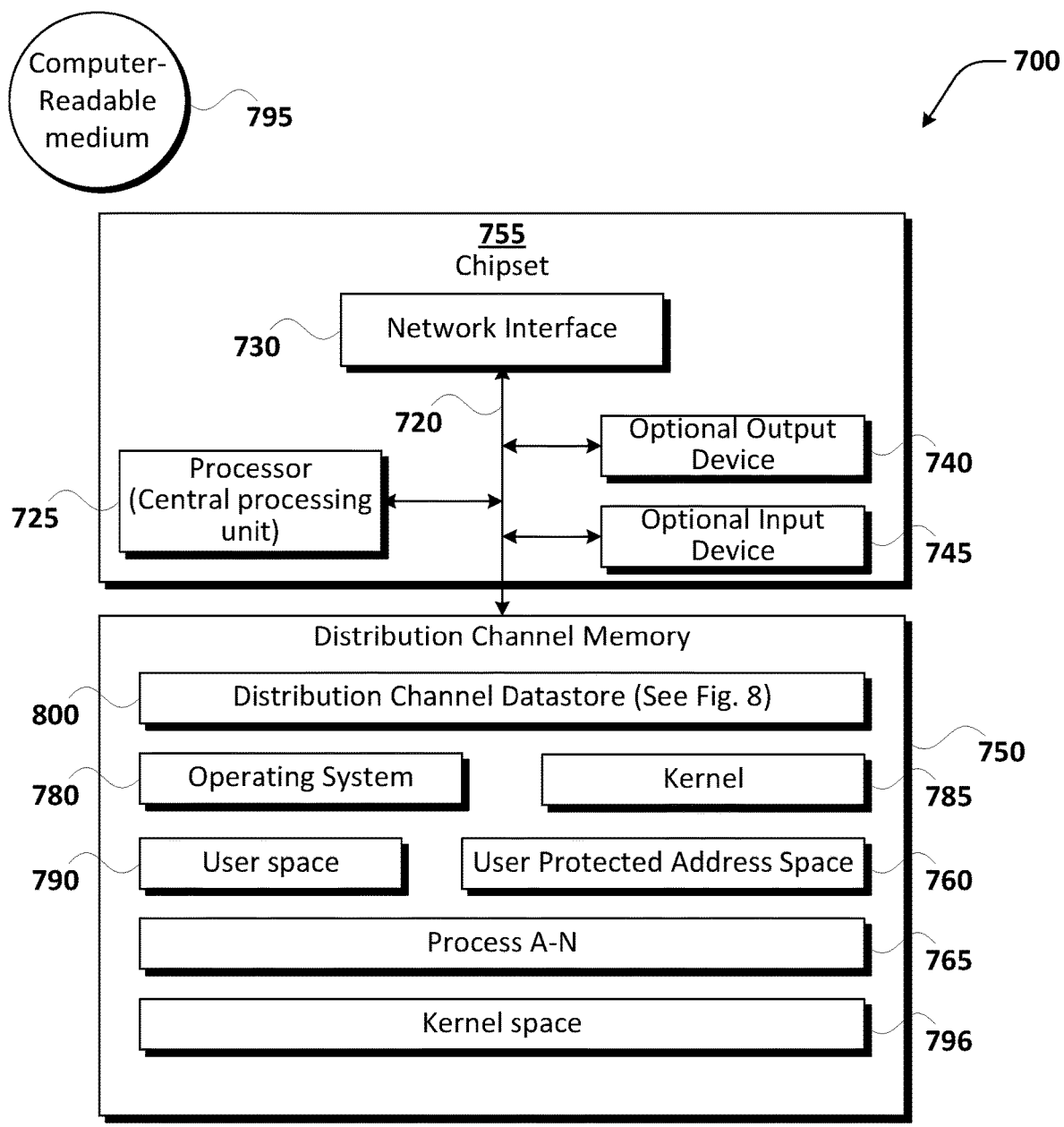
FIG. 7 is a functional block diagram illustrating an example of a distribution channel computer device incorporated with teachings of the present disclosure, according to some embodiments.

FIG. 7 is a functional block diagram illustrating an example of distribution channel 700 incorporated with the teachings of the present disclosure, according to some embodiments. Distribution channel 700 may include chipset 755, comprising processor 725, input/output (I/O) port(s) and peripheral devices, such as output 740 and input 745, and network interface 730, and distribution channel memory 750, all interconnected via bus 720. Network Interface 730 may be utilized to form connections with network 150, with distribution channel datastore 800, or to form device-to-device connections with other computers.

Chipset 755 may include communication components and/or paths, e.g., buses 720, that couple processor 725 to peripheral devices, such as, for example, output 740 and input 745, which may be connected via I/O ports. For example, chipset 755 may include a peripheral controller hub (PCH). In another example, chipset 755 may include a sensors hub. Input 745 and output 740 may include, for example, user interface device(s) including a display, a touch-screen display, printer, keypad, keyboard, etc., sensor(s) including accelerometer, global positioning system (GPS), gyroscope, etc., communication logic, wired and/or wireless, storage device(s) including hard disk drives, solid-state drives, removable storage media, etc. I/O ports for input 745 and output 740 may be configured to transmit and/or receive commands and/or data according to one or more communications protocols. For example, one or more of the I/O ports may comply and/or be compatible with a universal serial bus (USB) protocol, peripheral component interconnect (PCI) protocol (e.g., PCI express (PCIe)), or the like.

Distribution channel memory 750 may generally comprise a random access memory ("RAM"), a read only memory ("ROM"), and a permanent mass storage device, such as a disk drive or SDRAM (synchronous dynamic random-access memory). Distribution channel memory 750 may store program code for software modules or routines, such as, for example, interactive experience execution module 1000 (illustrated and discussed further in relation to FIG. 10), to the extent that distribution channel 700 may act as coordinator 500.

Distribution channel memory 750 may also store operating system 780. These software components may be loaded from a non-transient computer readable storage medium 795 into distribution channel memory 750 using a drive mechanism associated with a non-transient computer readable storage medium 795, such as a floppy disc, tape, DVD/CD-ROM drive, memory card, or other like storage medium. In some embodiments, software components may also or instead be loaded via a mechanism other than a drive mechanism and computer readable storage medium 795 (e.g., via network interface 730).

Figure 8:
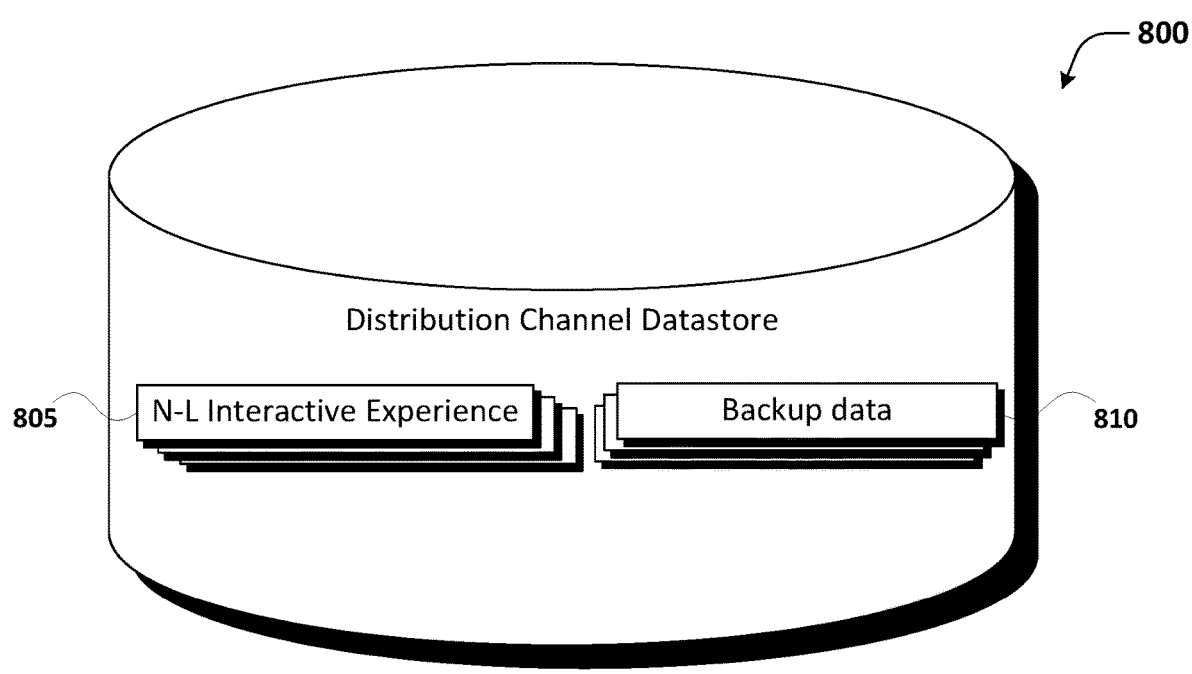
FIG. 8 is a functional block diagram illustrating an example of a distribution channel datastore for practicing the present disclosure, consistent with embodiments of the present disclosure.

Distribution channel memory 750 is also illustrated as comprising kernel 785, kernel space 796, user space 790, user protected address space 760, and distribution channel datastore 800 (illustrated and discussed further in relation to FIG. 8).

Distribution channel memory 750 may store one or more process 765 (i.e., executing software application(s)). Process 765 may be stored in user space 790. Process 765 may include one or more process 765*a* . . . 765*n*. One or more process 765 may execute generally in parallel, i.e., as a plurality of processes and/or a plurality of threads. Process 765 corresponds to one example of an executing software application, such as, for example, interactive experience execution module 1000. Process 765 may be executed as a plurality of threads.

Distribution channel memory 750 is further illustrated as storing operating system 780 and/or kernel 785. The operating system 780 and/or kernel 785 may be stored in kernel space 796. In some embodiments, operating system 780 may include kernel 785. One or more process 765 may be unable to directly access kernel space 796. In other words, operating system 780 and/or kernel 785 may attempt to protect kernel space 796 and prevent access by certain of process 765*a* . . . 765*n*.

Kernel 785 may be configured to provide an interface between user processes and circuitry associated with distribution channel 700. In other words, kernel 785 may be configured to manage access to processor 725, chipset 755, I/O ports and peripheral devices by process 765. Kernel 785 may include one or more drivers configured to manage and/or communicate with elements of distribution channel 700 (i.e., processor 725, chipset 755, I/O ports and peripheral devices).

Distribution channel 700 may also comprise or communicate via Bus 720 with distribution channel datastore 800, illustrated and discussed further in relation to FIG. 8. In various embodiments, bus 720 may comprise a storage area network ("SAN"), a high speed serial bus, and/or via other suitable communication technology. In some embodiments, distribution channel 700 may communicate with distribution channel datastore 800 via network interface 730. Distribution channel 700 may, in some embodiments, include many more components than as illustrated. However, it is not necessary that all components be shown in order to disclose an illustrative embodiment.

FIG. 8 is a functional block diagram of the distribution channel datastore 800 illustrated in the author device of FIG. 7, according to some embodiments. The components of distribution channel datastore 800 may include data groups used by modules and/or routines, e.g, non-linear interactive program 805 and backup data 810 (to be described more fully below). The data groups used by modules or routines illustrated in FIG. 8 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, references to other database entries, joins, conditional logic, tests, and similar. The components of distribution channel datastore 800 are discussed at great length further herein in the discussion of other of the Figures.

In overview, non-linear interactive program 805 comprises one or more records comprising an executable program created through the use of interactive experience creation module 900. In distribution channel 700, non-linear interactive program 805 may be received from, for example, author device 300.

Backup data 810 comprise one or more records which backup data produced or used during execution of a non-linear interactive program.

FIG. 9 is a flow diagram illustrating an example of and algorithmic structure for interactive experience creation module 900, according to some embodiments. Interactive experience creation module 900 may be executed by, for example, author device 300.

Interactive experience creation module 900 may begin creation of a non-linear interactive program, wherein the non-linear interactive program may be stored in author datastore 400 as one or more non-linear interactive program 405 records. Interactive experience creation module 900 may present a graphical user interface which facilitates understanding the relationship between output device selection criteria, output, and input; such a graphical user interface may include Venn diagrams, tree structures, network structures, and the like.

At block 905, interactive experience creation module 900 may create one or more action stages, such as in response to user input by an author or creator of non-linear interactive program. The author's user input may be in the form of text, speech input, selection from a list of pre-action stages (such as from other authors), image input, and the like. As discussed herein, the action stages may comprise multiple challenges communicated through multiple output, output via player devices and peripherals selected by application of output device selection criteria relative to available devices, multiple input from players and peripherals, evaluation of multiple input-output criteria, and goal completions or other output along a route, potentially, to goal completion of the action stage. Action stages may be stored in author datastore 400 as one or more action stage 430 records.

Opening loop block 910 to closing loop block 935 iterative over each action stage of block 905. As throughout, the order of blocks between opening loop block 910 to closing loop block 935 may be varied. During creation of a non-linear interactive program, interactive experience creation module 900 may allow the author to switch between the various blocks (including switching to block 905).

At block 915, interactive experience creation module 900 may, such as in response to input by an author, create output device selection criteria for the then-current action stage, which may be stored in author datastore as one or more output device selection criteria 410 records. Output device selection criteria 410 may be used to select which output devices, such as players and peripherals, may render associated output of the action stage. For example, output device selection criteria 410 may comprise a random selection among a group of available output devices, a selection by the coordinating device or the backup coordinating device among the group of available output devices, a self-selection by a user of the output device, a selection of an output device based on at least one of a location of the output device, a display characteristic of the output device, a processing power of the output device, a goal completion status of a user of the output device, a participant role of a user of the output device, a battery life of the output device, an availability of non-battery power to the output device, an output device most recently added during the runtime instance of the non-linear interactive program, or an output device most heavily used during the runtime instance of the non-linear interactive program. As noted, output device selection criteria 410 may be created with respect to or for player participant roles. For example, player participant roles may comprise coordinator, purchaser, or player. Output device selection criteria 410 may be associated with specific output 420, and/or may be used to select which output devices (players and peripherals) may participate in a non-linear interactive program and/or action stage thereof.

At block 920, interactive experience creation module 900 may, such as in response to input by an author, create output for the then-current action stage. Output may be provided to one or more output device, such as a player and/or peripheral, unconditionally, according to one or output device selection criteria 410, and/or conditionally, on provision of associated input 415. Output communicates information to players, such as aesthetic information, rules, puzzles, problems, challenges, tests, clues, maps, instructions, misdirection, encouragement, and constructive information. Output may also communicate information regarding players' and/or teams' progress in relation to non-linear interactive program 405, action stages therein, and sub-goals within an action stage; such information may include, for example, rewards, scored points, public recognition and the like. Output may be store in author datastore as one or more output 420 records. Classes of output or specific output may be "defaults", which the author may select and customize at this block.

At block 925, interactive experience creation module 900 may, such as in response to input by an author, create input for the then-current action stage. Input, potentially in conjunction with input-output criteria, when detected during a runtime instance of non-linear interactive program 405, produces a portion of the output (a portion of the output may be provided unconditionally). Examples of input comprise at least one of a text input value, a voice input value, an image input value, a touch input value, an actuator input value, an orientation of device(s) input value, an output from a programmed electronic device, and a location input value. Such values may also be ranges of values. Input may be provided during runtime by a player device or a peripheral device. Classes of input or specific input may be "defaults", which the author may select and customize at this block. Input may comprise attempts by users, via player devices, to solve the puzzles, challenges, and problems provided in output of the non-linear interactive program. Input may be stored in author datastore as one or more input 415 records.

At block 930, interactive experience creation module 900 may, such as in response to input by an author, create input-output criteria. Input-output criteria may impose additional rules before an input will generate a corresponding output during execution of a non-linear interactive program. Input-output criteria may comprise rules such as, for example, receipt of one or more messages comprising the input during a runtime instance of the non-linear interactive program, wherein the message(s) is(are) received from at least one participant proving the input within a time period, from a number of participants, or from a participant or a number of participants with a goal completion status in the non-linear interactive experience. For example, an input-output criteria may require that input messages be received from at least two participants within a time period, two participants with a goal completion status, or the like, and wherein the message comprises an input 415, such as an orientation of the devices input value, such as that the two devices face each other, face away, or be in another orientation. For example, an input-output criteria may require that a set of input 415 be received in a particular order and/or that a sequence of input and output interactions occur and/or occur in a particular order. Input-output criteria may be understood as defining "meta" input, comprising multiple other inputs. Certain of the input may produce an output, without satisfaction of input-output criteria but, when an input-output criteria is satisfied, may produce an additional or different output.

Input 415 which may be processed by a runtime instance of a non-linear interactive program may be determined according to output devices selected according to output device selection criteria (created in block 915); similarly, input-output criteria which may be relevant to a runtime instance of a non-linear interactive program may be determined according to output devices selected according to output device selection criteria.

Input-output criteria may be stored in author datastore 400 as, for example, one or more input-output criteria 425 records.

At closing loop block 935, interactive experience creation module 900 may return to opening loop block 910 to iterate over the next action stage, if any.

At block 940, interactive experience creation module 900 may store the result of the foregoing blocks as one or more non-linear interactive program 405 records.

At block 945, interactive experience creation module 900 may transmit or otherwise make the non-linear interactive program 405 available to a distribution channel, which may include requiring consideration for further distribution of the non-linear interactive program 405. Non-linear interactive program 405 or access to non-linear interactive program 405 may be stored in distribution channel datastore 800 as, for example, one or more non-linear interactive program 805 records.

At done block 999, interactive experience creation module 900 may conclude and/or may return to another process.

Figure 10A:
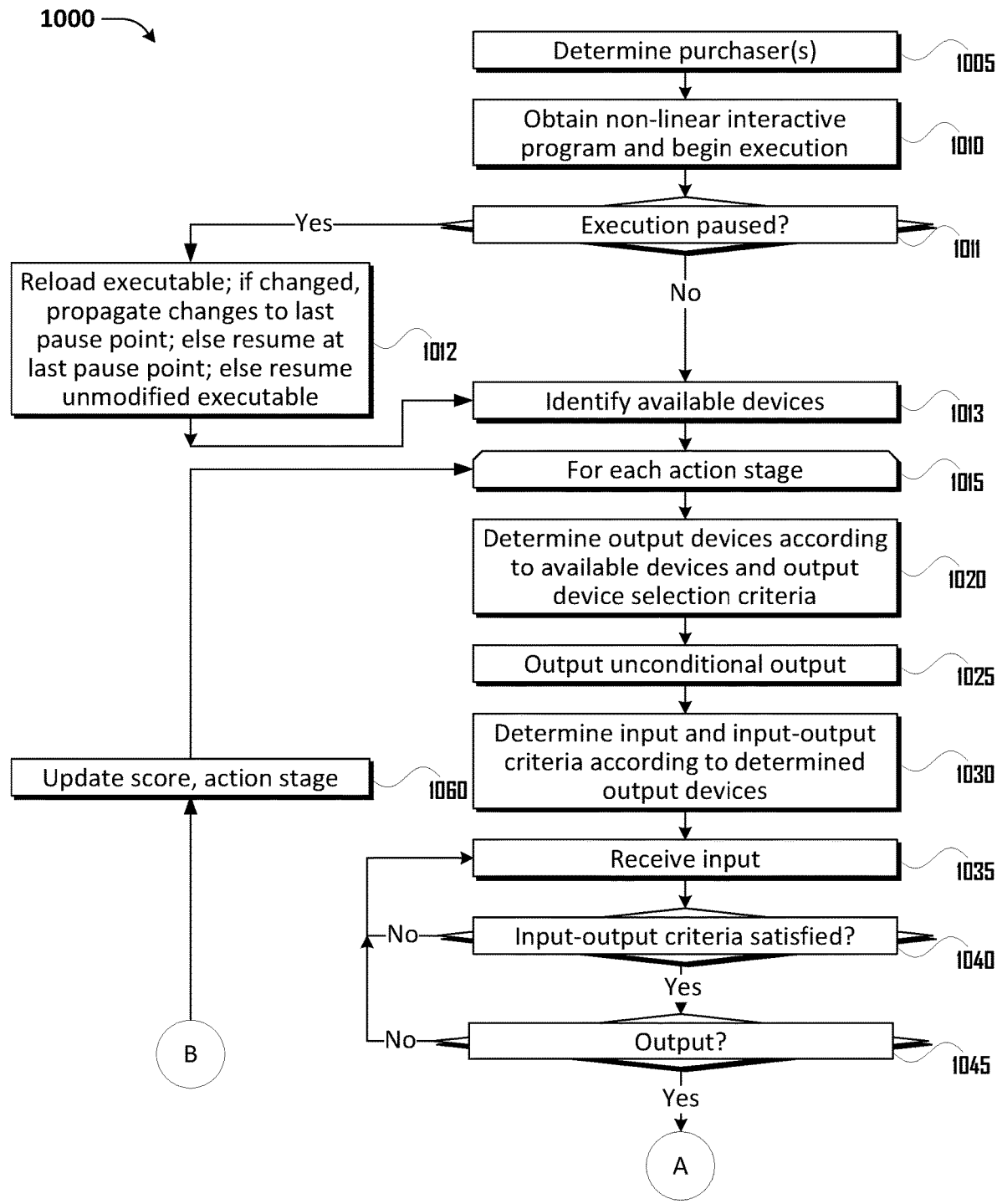
FIG. 10A is first portion of a flow diagram illustrating an example of and algorithmic structure for an interactive experience execution module, according to some embodiments.
Figure 10B:
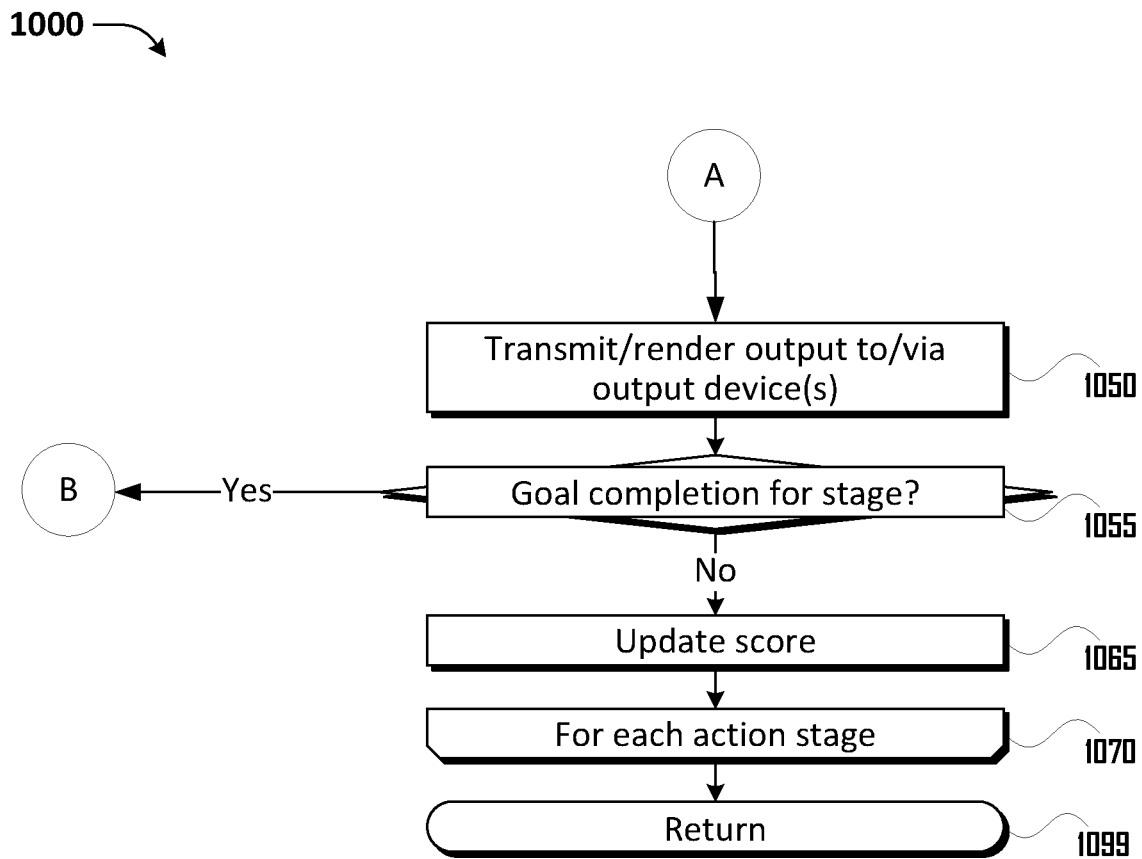
FIG. 10B is a second portion of a flow diagram illustrating an example of and algorithmic structure for an interactive experience execution module, according to some embodiments.

FIG. 10A is first portion of a flow diagram illustrating an example of and algorithmic structure for an interactive experience execution module 1000, according to some embodiments. FIG. 10A is continued in FIG. 10B. Interactive experience execution module 1000 may be executed by, for example, coordinator 500.

A block 1005, and if not already performed, a purchaser(s) of a non-linear interactive program may be determined. The purchase provides consideration for the non-linear interactive program, such as a one-time payment, a recurring payment, a purchase, a rental, a license, or the like. The purchaser may be coordinator, a separate party, and/or one or more players of the non-linear interactive program.

At block 1010, a non-linear interactive program may be obtained and execution of it in a runtime instance may begin or may resume, if execution had been started previously and paused. Non-linear interactive program may be stored in coordinator datastore 600 as one or more non-linear interactive program 605 records. Components of non-linear interactive program 605 may be unpacked, identified, and/or stored in coordinator datastore 600, such as, for example, output device selection criteria 610, input 615, output 620, input-output criteria 625, and action stage 630. Throughout execution of non-linear interactive program, execution may be paused or stopped.

At decision block 1011, interactive experience execution module 1000 may determine if is resuming execution from a pause in execution. If affirmative or equivalent at decision block 1011, then at block 1012, interactive experience execution module 1000 may reload the executable, which may involve accessing a changed version, such as a version which has been debugged, upgraded, updated, or otherwise changed. When reloading a changed executable, interactive experience execution module 1000 may optionally re-process input and simulate output, starting from an uninitialized state in the changed version, such that execution resumes in the changed executable at or close to the pause point, but with an execution state which may be according to the changed executable. For example, if the executable had been changed to change the scoring, then this may cause the executable to resume with revised scoring. Because the change in the executable may affect the logic of the input/output progression, re-execution may not be possible past a certain point without producing an error and/or re-execution may produce a different resume machine state for the non-linear interactive program; therefore, a user, such as a coordinator, may be given a choice to execute the changed executable and to propagate changes as far as possible, to resume the original executable, or to resume execution in the modified executable, but using the machine state of the original executable.

At block 1013, available output devices may be identified. Identification of output devices may be aided by an application or the like in one or more potential player devices, in one or more peripheral devices, or by a device which manages peripheral devices. The application may report the presence of the device and its availability to participate in a non-linear interactive program. The application may further enable participation of the device in the non-linear interactive program. The application may report the capabilities of the device. The report may be relative to an area of an action stage 630 of non-linear interactive program 605, such as, for example, devices in area-1205A. Records regarding available output devices may be stored in, for example, coordinator datastore 600, as one or more output device 640 records.

Opening loop block 1015 to closing loop block 1070 may iterate for each action stage 630 in the non-linear interactive program 605.

At block 1020, coordinator 500 and interactive experience execution module 1000 may determine output devices according to output device selection criteria 610 and available output devices, such as though identified at block 1013. For example, among ten available player devices and three available peripherals, output device selection criteria 610 may establish that eight of the ten player devices may be used to render output, while two of the ten player devices may not render output and/or may not participate in the non-linear interactive program 605. Output device selection criteria 610 may establish that both peripheral devices may be used, but that one of the peripheral devices may incur a charge, while the second will not, so coordinator 500 and interactive experience execution module 1000 may select only the first peripheral. Records regarding output devices may be store in coordinator datastore 600 as one or more output device 640 records. If it has not already happened, output devices may report their capabilities—such as screen size, power availability, location and the like—to coordinator 500 and interactive experience execution module 1000; such capabilities may be stored in or associated with output device 640 records.

At block 1025, interactive experience execution module 1000 may access output 620 records, identify unconditional output, and output unconditional output to one or more of the output devices. Unconditional output maybe, for example, output which does not need to be triggered by (or which is conditioned on) an input. The may be, for example, logos for the action stage, logos of a sponsor, introductory or basic instructions (like forming or presence on teams), or the like. Unconditional output may be sent to output devices 640 capable of rendering the content (such devices may have been identified at block 1020).

At block 1030, interactive experience execution module 1000 may determine among the entire set of input 615, which input 615 may be received from the output devices 640 for the current action stage. At block 1030, interactive experience execution module 1000 may also determine which input-output criteria 625 may be relevant in relation to the input 615 that may be received from the output devices 640.

At block 1035, interactive experience execution module 1000 may optionally receive input from output devices 640. The input may be actively sent by users of output devices 640 and/or the input may be generated by an output device 640, such as a location information, an orientation information, and sent to interactive experience execution module 1000 without the active involvement of the player. The input may be produced by an application executed by the player device. The input may be processed to determine that it corresponds to input 615.

At decision block 1040, interactive experience execution module 1000 may determine whether input-output criteria 625 which may apply to the input is satisfied. If negative or equivalent, interactive experience execution module 1000 may return to block 1035 to receive (or to wait to receive) input. If affirmative or equivalent at decision block 1040, at decision block 1045, interactive experience execution module 1000 may determine whether output 620 is associated with the input 615. If negative or equivalent, interactive experience execution module 1000 may return to block 1035 to receive (or to wait to receive) input. If affirmative or equivalent, at block 1050, interactive experience execution module 1000 may transmit output 620 to compatible output devices to be rendered or output by such device(s). For example, interactive experience execution module 1000 may transmit output 620 comprising a puzzle, which output is to be rendered by one or more players identified in block 1020. By way of another example, output 620 may comprise a goal completion; such output may comprise points or a score, graphics, the unlocking of a door or locked box or other device, or the like. By way of another example, output 620 may comprise deactivation of a player computer with respect to the action stage and/or non-linear interactive program. Examples of output may comprise one or more of a text, an image, an audio, a 2-dimensional print, 3-dimensional print, a peripheral device control, an executable software program, a deactivation of a player computer, a pause, or a goal completion.

At decision block 1055, interactive experience execution module 1000 may determine whether output 620 comprises a goal completion for a then-current action stage, such as if the players solved a puzzle. If affirmative or equivalent, at block 1060, interactive experience execution module 1000 may update the score for one or more player devices, which score may be noted in output 620 to such device and/or in one or more score 635 records. Interactive experience execution module 1000 may also update the action stage of the non-linear interactive program 605 (such as with respect to a team or player) and may return to opening loop block 1015. If negative or equivalent at decision block 1055, then at block 1065, interactive experience execution module 1000 may update score 635 records (if the output 620 was associated with earned points or the like). At block 1070, interactive experience execution module 1000 may return to block 1015, such as to re-initiate the then-current action stage, or to block 1035 to wait for further input 615 in relation to the then-current action stage.

At done block 1099, interactive experience execution module 1000 may conclude and/or return to a process which may have spawned it.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions. USB (Universal serial bus) may comply or be compatible with Universal Serial Bus Specification, Revision 2.0, published by the Universal Serial Bus organization, Apr. 27, 2000, and/or later versions of this specification, for example, Universal Serial Bus Specification, Revision 3.1, published Jul. 26, 2013. PCIe may comply or be compatible with PCI Express 3.0 Base specification, Revision 3.0, published by Peripheral Component Interconnect Special Interest Group (PCI-SIG), November 2010, and/or later and/or related versions of this specification.

As used in any embodiment herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

Following are examples:

Example 1

An apparatus for computing, comprising: a computer processor and a memory; and an interactive experience creation module to create a non-linear interactive program, wherein to create the non-linear interactive program, the interactive experience creation module is to create a set of action stages and an output device selection criteria, wherein each action stage in the set of action stages comprises an output, an input, and an input-output criteria.

Example 2

The apparatus according to Example 1, wherein the output of an action stage comprises at least one of a text, an image, an audio, a 2-dimensional print, 3-dimensional print, a peripheral device control, an executable software program, a deactivation of a player computer, a pause, or a goal completion.

Example 3

The apparatus according to Example 2, wherein the goal completion in relation to a first action stage in the set of action stages activates a second action stage in the set of action stages during a runtime instance of the non-linear interactive program.

Example 4

The apparatus according to Example 1, wherein the input of an action stage comprises at least one of a text input value, a voice input value, an image input value, a touch input value, an actuator input value, an orientation of device(s) input value, an output from a programmed electronic device, and a location input value.

Example 5

The apparatus according to Example 4, wherein the image input comprises an image of a physical object, wherein the image of the physical object is processed by an image processing module to determine the image input value.

Example 6

The apparatus according to Example 5, wherein the physical object comprises at least one of a 2-dimensionally printed object, a 3-dimensionally printed object, a building, a person, an animal, or an object assembled during a runtime instance of the non-linear interactive program.

Example 7

The apparatus according to Example 6, wherein the 2-dimensionally printed object comprises at least one of a bar code, a matrix bar code, and a 2-dimensional print.

Example 8

The apparatus according to Example 1, wherein the input-output criteria of an action stage in the set of action stages comprises receipt of a message comprising the input during a runtime instance of the non-linear interactive program, wherein the message is received from at least one participant proving the input within a time period, from a number of participants providing the input, or from a participant or a number of participants with a goal completion status in the non-linear interactive experience.

Example 9

The apparatus according to Example 8, wherein the input-output criteria of the action stage comprises the message from at least two participants within the time period, wherein the message comprises the orientation of the devices input value, and wherein the output comprises the goal completion.

Example 10

The apparatus according to Example 1, wherein the output device selection criteria is to be used during a runtime instance of the non-linear interactive program to select at least one of a coordinating device, wherein the coordinating device is to coordinate a runtime instance of the non-linear interactive program, a backup coordinating device, wherein the backup coordinating device is to coordinate the runtime instance of the non-linear interactive program when the coordinating device is unavailable, a purchaser, wherein the purchaser is to provide consideration to obtain the non-linear interactive program, a player, wherein the player is to play the runtime instance of the non-linear interactive program under the coordination of the coordinator, or a peripheral device.

Example 11

The apparatus according to Example 10, wherein the output device selection criteria comprises at least one of a random selection among a group of available output devices, a selection by the coordinating device or the backup coordinating device among the group of available output devices, a self-selection by a user of the output device, a selection of an output device based on at least one of a location of the output device, a display characteristic of the output device, a processing power of the output device, a goal completion status of a user of the output device, a participant role of a user of the output device, a battery life of the output device, an availability of non-battery power to the output device, an output device most recently added during the runtime instance of the non-linear interactive program, or an output device most heavily used during the runtime instance of the non-linear interactive program.

Example 12

The apparatus according to Example 11, wherein the participant role of the user of the output device comprises at least one of the coordinator, the purchaser, or the player.

Example 13

The apparatus according to Example 12, wherein the interactive experience creation module is to create the output device selection criteria to select the coordinator participant role during a runtime instance of the non-linear interactive program according to at least one of the self-selection criteria, the output device first or most recently added during the runtime instance of the non-linear interactive program, or the processor power of the output device.

Example 14

The apparatus according to Example 12, wherein the interactive experience creation module is to create the output device selection criteria comprising a set of player participant roles, each player participant role in the set comprising differing participant role output device selection criteria, wherein the set of all differing participant role output device selection criteria are used during the runtime instance of the non-linear interactive program to select output devices for the player participant roles.

Example 15

The apparatus according to Example 14, further comprising creating a set of output and a set of input-output criteria, wherein output and input-output criteria are selected during the runtime instance of the non-linear interactive program at least in part according the selected output devices for the player participant roles.

Example 16

The apparatus according to Example 10, wherein the peripheral device comprises at least one of an audio and/or visual rendering device, an electronically or mechanically controlled lock, an electronically controlled actuator, or a communication device.

Example 17

An apparatus for computing, comprising: a computer processor and a memory; and an interactive experience execution module to perform an execution of a non-linear interactive program, wherein to perform the execution the non-linear interactive program, the interactive experience execution module is to: obtain access to the non-linear interactive program comprising a set of action stages and an output device selection criteria, wherein each action stage in the set of action stages comprises an output, an input, and an input-output criteria; determine a set of output devices according to the output device selection criteria; receive the input and determine the output according to the input-output criteria.

Example 18

The apparatus according to Example 17, wherein the output of an action stage in the set of action stages comprises at least one of a text, an image, an audio, a 2-dimensional print, 3-dimensional print, a peripheral device control, an executable software program, a deactivation of a player computer, a pause, or a goal completion.

Example 19

The apparatus according to Example 18, wherein the goal completion in relation to a first action stage in the set of action stages activates a second action stage in the set of action stages during the execution of the non-linear interactive program.

Example 20

The apparatus according to Example 17, wherein the input of an action stage comprises at least one of a text input value, a voice input value, an image input value, a touch input value, an actuator input value, an orientation of device(s) input value, and a location input value.

Example 21

The apparatus according to Example 20, wherein the image input value comprises an image of a physical object, wherein the image of the physical object is processed by an image processing module to determine the image input value.

Example 22

The apparatus according to Example 21, wherein the physical object comprises at least one of a 2-dimensionally printed object, a 3-dimensionally printed object, a building, a person, an animal, or an object assembled during a runtime instance of the non-linear interactive program.

Example 23

The apparatus according to Example 22, wherein the 2-dimensionally printed object comprises at least one of a bar code, a matrix bar code, and a 2-dimensional print.

Example 24

The apparatus according to Example 17, wherein the input-output criteria of an action stage in the set of action stages comprises receipt of a message comprising the input during the execution of the non-linear interactive program, wherein the message is received from at least one participant proving the input within a time period, from a number of participants providing the input, or from a participant or a number of participants with a goal completion status in the non-linear interactive experience.

Example 25

The apparatus according to Example 24, wherein the input-output criteria of the action stage comprises the message from at least two participants within the time period, wherein the message comprises the orientation of the devices input value, and wherein the output comprises the goal completion.

Example 26

The apparatus according to Example 17, wherein the interactive experience execution module is to use the output device selection criteria to select at least one of a coordinating device, wherein the coordinating device is to coordinate execution of the non-linear interactive program, a backup coordinating device, wherein the backup coordinating device is to coordinate the execution of the non-linear interactive program when the coordinating device is unavailable, a purchaser, wherein the purchaser is to provide consideration to obtain the non-linear interactive program, a player, wherein the player is to play the non-linear interactive program under the coordination of the coordinator, or a peripheral device.

Example 27

The apparatus according to Example 26, wherein the output device selection criteria comprises at least one of a random selection among a group of available output devices, a selection by the coordinating device or the backup coordinating device among the group of available output devices, a self-selection by a user of the output device, a selection of an output device based on at least one of a location of the output device, a display characteristic of the output device, a processing power of the output device, a goal completion status of a user of the output device, a participant role of a user of the output device, a battery life of the output device, an availability of non-battery power to the output device, an output device most recently added during the execution of the non-linear interactive program, or an output device most heavily used during the execution of the non-linear interactive program.

Example 28

The apparatus according to Example 27, wherein the participant role of the user of the output device comprises at least one of the coordinator, the purchaser, or the player.

Example 29

The apparatus according to Example 28, wherein the interactive experience execution module is to use the output device selection criteria to select the coordinator participant role during the execution of the non-linear interactive program according to at least one of the self-selection criteria, the output device first or most recently added during the execution of the non-linear interactive program, or the processor power of the output device.

Example 30

The apparatus according to Example 28, wherein the output device selection criteria comprise a set of player participant roles, each player participant role in the set comprising differing participant role output device selection criteria, wherein the set of all differing participant role output device selection criteria are used during the execution of the non-linear interactive program to select output devices for the player participant roles.

Example 31

The apparatus according to Example 30, wherein the interactive experience execution module is to select output and input-output criteria during the execution of the non-linear interactive program according to at least one of the output device selected for at least one of the player participant roles.

Example 32

The apparatus according to Example 26, wherein the peripheral device comprises at least one of an audio and/or visual rendering device, an electronically or mechanically controlled lock, an electronically controlled actuator, or a communication device.

Example 33

A computer implemented method, comprising: creating a non-linear interactive program by creating a set of action stages and an output device selection criteria, wherein each action stage in the set of action stages comprises an output, an input, and an input-output criteria.

Example 34

The method according to Example 33, wherein the output of an action stage comprises at least one of a text, an image, an audio, a 2-dimensional print, 3-dimensional print, a peripheral device control, an executable software program, a deactivation of a player computer, a pause, or a goal completion.

Example 35

The method according to Example 34, wherein the goal completion in relation to a first action stage in the set of action stages activates a second action stage in the set of action stages during a runtime instance of the non-linear interactive program.

Example 36

The method according to Example 33, wherein the input of an action stage comprises at least one of a text input value, a voice input value, an image input value, a touch input value, an actuator input value, an orientation of device(s) input value, an output from a programmed electronic device, and a location input value.

Example 37

The method according to Example 36, wherein the image input comprises an image of a physical object, and further comprising processing the image of the physical object to determine the image input value.

Example 38

The method according to Example 37, wherein the physical object comprises at least one of a 2-dimensionally printed object, a 3-dimensionally printed object, a building, a person, an animal, or an object assembled during a runtime instance of the non-linear interactive program.

Example 39

The method according to Example 38, wherein the 2-dimensionally printed object comprises at least one of a bar code, a matrix bar code, and a 2-dimensional print.

Example 40

The method according to Example 33, wherein the input-output criteria of an action stage in the set of action stages comprises receipt of a message comprising the input during a runtime instance of the non-linear interactive program, wherein the message is received from at least one participant proving the input within a time period, from a number of participants providing the input, or from a participant or a number of participants with a goal completion status in the non-linear interactive experience.

Example 41

The method according to Example 40, wherein the input-output criteria of the action stage comprises the message from at least two participants within the time period, wherein the message comprises the orientation of the devices input value, and wherein the output comprises the goal completion.

Example 42

The method according to Example 33, wherein the output device selection criteria is to be used during a runtime instance of the non-linear interactive program to select at least one of a coordinating device, wherein the coordinating device is to coordinate a runtime instance of the non-linear interactive program, a backup coordinating device, wherein the backup coordinating device is to coordinate the runtime instance of the non-linear interactive program when the coordinating device is unavailable, a purchaser, wherein the purchaser is to provide consideration to obtain the non-linear interactive program, a player, wherein the player is to play the runtime instance of the non-linear interactive program under the coordination of the coordinator, or a peripheral device.

Example 43

The method according to Example 42, wherein the output device selection criteria comprises at least one of a random selection among a group of available output devices, a selection by the coordinating device or the backup coordinating device among the group of available output devices, a self-selection by a user of the output device, a selection of an output device based on at least one of a location of the output device, a display characteristic of the output device, a processing power of the output device, a goal completion status of a user of the output device, a participant role of a user of the output device, a battery life of the output device, an availability of non-battery power to the output device, an output device most recently added during the runtime instance of the non-linear interactive program, or an output device most heavily used during the runtime instance of the non-linear interactive program.

Example 44

The method according to Example 43, wherein the participant role of the user of the output device comprises at least one of the coordinator, the purchaser, or the player.

Example 45

The method according to Example 44, further comprising creating the output device selection criteria to select the coordinator participant role during a runtime instance of the non-linear interactive program according to at least one of the self-selection criteria, the output device first or most recently added during the runtime instance of the non-linear interactive program, or the processor power of the output device.

Example 46

The method according to Example 44, creating the output device selection criteria comprising a set of player participant roles, each player participant role in the set comprising differing participant role output device selection criteria, wherein the set of all differing participant role output device selection criteria are used during the runtime instance of the non-linear interactive program to select output devices for the player participant roles.

Example 47

The method according to Example 46, further comprising creating a set of output and a set of input-output criteria, wherein output and input-output criteria are selected during the runtime instance of the non-linear interactive program at least in part according the selected output devices for the player participant roles.

Example 48

The method according to Example 42, wherein the peripheral device comprises at least one of an audio and/or visual rendering device, an electronically or mechanically controlled lock, an electronically controlled actuator, or a communication device.

Example 49

An computer implemented method, comprising: performing an execution of a non-linear interactive program by: obtaining access to the non-linear interactive program comprising a set of action stages and an output device selection criteria, wherein each action stage in the set of action stages comprises an output, an input, and an input-output criteria; determining a set of output devices in an area according to the output device selection criteria; and receiving the input and determining the output according to the input-output criteria.

Example 50

The method according to Example 49, wherein the output of an action stage in the set of action stages comprises at least one of a text, an image, an audio, a 2-dimensional print, 3-dimensional print, a peripheral device control, an executable software program, a deactivation of a player computer, a pause, or a goal completion.

Example 51

The method according to Example 50, further comprising, the goal completion in relation to a first action stage in the set of action stages activating a second action stage in the set of action stages during the execution of the non-linear interactive program.

Example 52

The method according to Example 49, wherein the input of an action stage comprises at least one of a text input value, a voice input value, an image input value, a touch input value, an actuator input value, an orientation of device(s) input value, and a location input value.

Example 53

The method according to Example 52, wherein the image input value comprises an image of a physical object, and further comprising processing the image of the physical object to determine the image input value.

Example 54

The method according to Example 53, wherein the physical object comprises at least one of a 2-dimensionally printed object, a 3-dimensionally printed object, a building, a person, an animal, or an object assembled during a runtime instance of the non-linear interactive program.

Example 55

The method according to Example 54, wherein the 2-dimensionally printed object comprises at least one of a bar code, a matrix bar code, and a 2-dimensional print.

Example 56

The method according to Example 49, wherein determining the set of output devices in the area according to the output device selection criteria by receiving a message comprising the input during the execution of the non-linear interactive program, wherein the message must be received from at least one participant proving the input within a time period, from a number of participants providing the input, or from a participant or a number of participants with a goal completion status in the non-linear interactive experience.

Example 57

The method according to Example 56, wherein the input-output criteria of the action stage comprises the message from at least two participants within the time period, wherein the message comprises the orientation of the devices input value, and wherein the output comprises the goal completion.

Example 58

The method according to Example 49, further comprising using the output device selection criteria to select at least one of a coordinating device, wherein the coordinating device is to coordinate execution of the non-linear interactive program, a backup coordinating device, wherein the backup coordinating device is to coordinate the execution of the non-linear interactive program when the coordinating device is unavailable, a purchaser, wherein the purchaser is to provide consideration to obtain the non-linear interactive program, a player, wherein the player is to play the non-linear interactive program under the coordination of the coordinator, or a peripheral device.

Example 59

The method according to Example 58, wherein the output device selection criteria comprises at least one of a random selection among a group of available output devices, a selection by the coordinating device or the backup coordinating device among the group of available output devices, a self-selection by a user of the output device, a selection of an output device based on at least one of a location of the output device, a display characteristic of the output device, a processing power of the output device, a goal completion status of a user of the output device, a participant role of a user of the output device, a battery life of the output device, an availability of non-battery power to the output device, an output device most recently added during the execution of the non-linear interactive program, or an output device most heavily used during the execution of the non-linear interactive program.

Example 60

The method according to Example 59, wherein the participant role of the user of the output device comprises at least one of the coordinator, the purchaser, or the player.

Example 61

The method according to Example 60, further comprising using the output device selection criteria to select the coordinator participant role during the execution of the non-linear interactive program according to at least one of the self-selection criteria, the output device first or most recently added during the execution of the non-linear interactive program, or the processor power of the output device.

Example 62

The method according to Example 60, wherein the output device selection criteria comprise a set of player participant roles, each player participant role in the set comprising differing participant role output device selection criteria, wherein the set of all differing participant role output device selection criteria are used during the execution of the non-linear interactive program to select output devices for the player participant roles.

Example 63

The method according to Example 62, further comprising selecting output and input-output criteria during the execution of the non-linear interactive program according to at least one of the output device selected for at least one of the player participant roles.

Example 64

The method according to Example 58, wherein the peripheral device comprises at least one of an audio and/or visual rendering device, an electronically or mechanically controlled lock, an electronically controlled actuator, or a communication device.

Example 65

An apparatus for computing, comprising: means to create a non-linear interactive program by creating a set of action stages and an output device selection criteria, wherein each action stage in the set of action stages comprises an output, an input, and an input-output criteria.

Example 66

The apparatus according to Example 65, wherein the output of an action stage comprises at least one of a text, an image, an audio, a 2-dimensional print, 3-dimensional print, a peripheral device control, an executable software program, a deactivation of a player computer, a pause, or a goal completion.

Example 67

The apparatus according to Example 66, wherein the goal completion in relation to a first action stage in the set of action stages activates a second action stage in the set of action stages during a runtime instance of the non-linear interactive program.

Example 68

The apparatus according to Example 65, wherein the input of an action stage comprises at least one of a text input value, a voice input value, an image input value, a touch input value, an actuator input value, an orientation of device(s) input value, an output from a programmed electronic device, and a location input value.

Example 69

The apparatus according to Example 68, wherein the image input comprises an image of a physical object, and further comprising means to process the image of the physical object to determine the image input value.

Example 70

The apparatus according to Example 69, wherein the physical object comprises at least one of a 2-dimensionally printed object, a 3-dimensionally printed object, a building, a person, an animal, or an object assembled during a runtime instance of the non-linear interactive program.

Example 71

The apparatus according to Example 70, wherein the 2-dimensionally printed object comprises at least one of a bar code, a matrix bar code, and a 2-dimensional print.

Example 72

The apparatus according to Example 65, wherein the input-output criteria of an action stage in the set of action stages comprises receipt of a message comprising the input during a runtime instance of the non-linear interactive program, wherein the message is received from at least one participant proving the input within a time period, from a number of participants providing the input, or from a participant or a number of participants with a goal completion status in the non-linear interactive experience.

Example 73

The apparatus according to Example 72, wherein the input-output criteria of the action stage comprises the message from at least two participants within the time period, wherein the message comprises the orientation of the devices input value, and wherein the output comprises the goal completion.

Example 74

The apparatus according to Example 65, wherein the output device selection criteria is to be used during a runtime instance of the non-linear interactive program to select at least one of a coordinating device, wherein the coordinating device is to coordinate a runtime instance of the non-linear interactive program, a backup coordinating device, wherein the backup coordinating device is to coordinate the runtime instance of the non-linear interactive program when the coordinating device is unavailable, a purchaser, wherein the purchaser is to provide consideration to obtain the non-linear interactive program, a player, wherein the player is to play the runtime instance of the non-linear interactive program under the coordination of the coordinator, or a peripheral device.

Example 75

The apparatus according to Example 74, wherein the output device selection criteria comprises at least one of a random selection among a group of available output devices, a selection by the coordinating device or the backup coordinating device among the group of available output devices, a self-selection by a user of the output device, a selection of an output device based on at least one of a location of the output device, a display characteristic of the output device, a processing power of the output device, a goal completion status of a user of the output device, a participant role of a user of the output device, a battery life of the output device, an availability of non-battery power to the output device, an output device most recently added during the runtime instance of the non-linear interactive program, or an output device most heavily used during the runtime instance of the non-linear interactive program.

Example 76

The apparatus according to Example 75, wherein the participant role of the user of the output device comprises at least one of the coordinator, the purchaser, or the player.

Example 77

The apparatus according to Example 76, further comprising means to create the output device selection criteria to select the coordinator participant role during a runtime instance of the non-linear interactive program according to at least one of the self-selection criteria, the output device first or most recently added during the runtime instance of the non-linear interactive program, or the processor power of the output device.

Example 78

The apparatus according to Example 76, further comprising means to create the output device selection criteria comprising a set of player participant roles, each player participant role in the set comprising differing participant role output device selection criteria, wherein the set of all differing participant role output device selection criteria are used during the runtime instance of the non-linear interactive program to select output devices for the player participant roles.

Example 79

The apparatus according to Example 78, further comprising means to create a set of output and a set of input-output criteria, wherein output and input-output criteria are to be selected during the runtime instance of the non-linear interactive program at least in part according the selected output devices for the player participant roles.

Example 80

The apparatus according to Example 74, wherein the peripheral device comprises at least one of an audio and/or visual rendering device, an electronically or mechanically controlled lock, an electronically controlled actuator, or a communication device.

Example 81

An apparatus for computing, comprising: means to perform an execution of a non-linear interactive program comprising means to obtain access to the non-linear interactive program comprising a set of action stages and an output device selection criteria, wherein each action stage in the set of action stages comprises an output, an input, and an input-output criteria; means to determine a set of output devices in an area according to the output device selection criteria; and means to receive the input, means to determine the output according to the input-output criteria, and means to output the output.

Example 82

The apparatus according to Example 81, wherein the output of an action stage in the set of action stages comprises at least one of a text, an image, an audio, a 2-dimensional print, 3-dimensional print, a peripheral device control, an executable software program, a deactivation of a player computer, a pause, or a goal completion.

Example 83

The apparatus according to Example 82, further comprising, means to determine the goal completion in relation to a first action stage in the set of action stages and means to determine the output comprising an activation of a second action stage in the set of action stages.

Example 84

The apparatus according to Example 81, further comprising means to process the input, wherein the input of an action stage comprises at least one of a text input value, a voice input value, an image input value, a touch input value, an actuator input value, an orientation of device(s) input value, and a location input value.

Example 85

The apparatus according to Example 84, wherein the image input value comprises an image of a physical object, and further comprising means to process the image of the physical object to determine the image input value.

Example 86

The apparatus according to Example 85, wherein the physical object comprises at least one of a 2-dimensionally printed object, a 3-dimensionally printed object, a building, a person, an animal, or an object assembled during a runtime instance of the non-linear interactive program.

Example 87

The apparatus according to Example 86, wherein the 2-dimensionally printed object comprises at least one of a bar code, a matrix bar code, and a 2-dimensional print.

Example 88

The apparatus according to Example 81, wherein means to determine the set of output devices in the area according to the output device selection criteria comprises means to receive a message comprising the input during the execution of the non-linear interactive program and means to determine that the message was received from at least one participant proving the input within a time period, from a number of participants providing the input, or from a participant or a number of participants with a goal completion status in the non-linear interactive experience.

Example 89

The apparatus according to Example 88, wherein the input-output criteria of the action stage comprises the message from at least two participants within the time period, wherein the message comprises the orientation of the devices input value, and means to determine the output as comprising the goal completion, and means to output the goal completion as the output.

Example 90

The apparatus according to Example 81, further comprising means to use the output device selection criteria to select at least one of a coordinating device, wherein the coordinating device is to coordinate execution of the non-linear interactive program, a backup coordinating device, wherein the backup coordinating device is to coordinate the execution of the non-linear interactive program when the coordinating device is unavailable, a purchaser, wherein the purchaser is to provide consideration to obtain the non-linear interactive program, a player, wherein the player is to play the non-linear interactive program under the coordination of the coordinator, or a peripheral device.

Example 91

The apparatus according to Example 90, wherein the output device selection criteria comprises at least one of a random selection among a group of available output devices, a selection by the coordinating device or the backup coordinating device among the group of available output devices, a self-selection by a user of the output device, a selection of an output device based on at least one of a location of the output device, a display characteristic of the output device, a processing power of the output device, a goal completion status of a user of the output device, a

35 participant role of a user of the output device, a battery life of the output device, an availability of non-battery power to the output device, an output device most recently added during the execution of the non-linear interactive program, or an output device most heavily used during the execution of the non-linear interactive program.

Example 92

The apparatus according to Example 91, wherein the participant role of the user of the output device comprises at least one of the coordinator, the purchaser, or the player.

Example 93

The apparatus according to Example 92, further comprising means to use the output device selection criteria to select the coordinator participant role during the execution of the non-linear interactive program according to at least one of the self-selection criteria, the output device first or most recently added during the execution of the non-linear interactive program, or the processor power of the output device.

Example 94

The apparatus according to Example 92, wherein the output device selection criteria comprise a set of player participant roles, each player participant role in the set comprising differing participant role output device selection criteria, and further comprising means to use the set of all differing participant role output device selection criteria during the execution of the non-linear interactive program to select output devices for the player participant roles.

Example 95

The apparatus according to Example 94, further comprising means to select output and input-output criteria during the execution of the non-linear interactive program according to at least one of the output device selected for at least one of the player participant roles.

Example 96

The apparatus according to Example 90, wherein the peripheral device comprises at least one of an audio and/or visual rendering device, an electronically or mechanically controlled lock, an electronically controlled actuator, or a communication device.

Example 97

One or more computer-readable media comprising instructions that cause a computer device, in response to execution of the instructions by a processor of the computer device, to: create a non-linear interactive program by creating a set of action stages and an output device selection criteria, wherein each action stage in the set of action stages comprises an output, an input, and an input-output criteria.

Example 98

The computer-readable media according to Example 97, wherein the output of an action stage comprises at least one of a text, an image, an audio, a 2-dimensional print, 3-dimensional print, a peripheral device control, an executable software program, a deactivation of a player computer, a pause, or a goal completion.

Example 99

The computer-readable media according to Example 98, wherein the goal completion in relation to a first action stage in the set of action stages activates a second action stage in the set of action stages during a runtime instance of the non-linear interactive program.

Example 100

The computer-readable media according to Example 97, wherein the input of an action stage comprises at least one of a text input value, a voice input value, an image input value, a touch input value, an actuator input value, an orientation of device(s) input value, an output from a programmed electronic device, and a location input value.

Example 101

The computer-readable media according to Example 100, wherein the image input comprises an image of a physical object, and wherein the computer device is further to process the image of the physical object to determine the image input value.

Example 102

The computer-readable media according to Example 101, wherein the physical object comprises at least one of a 2-dimensionally printed object, a 3-dimensionally printed object, a building, a person, an animal, or an object assembled during a runtime instance of the non-linear interactive program.

Example 103

The computer-readable media according to Example 102, wherein the 2-dimensionally printed object comprises at least one of a bar code, a matrix bar code, and a 2-dimensional print.

Example 104

The computer-readable media according to Example 97, wherein the input-output criteria of an action stage in the set of action stages comprises receipt of a message comprising the input during a runtime instance of the non-linear interactive program, wherein the message is to be received from at least one participant proving the input within a time period, from a number of participants providing the input, or from a participant or a number of participants with a goal completion status in the non-linear interactive experience.

Example 105

The computer-readable media according to Example 104, wherein the input-output criteria of the action stage comprises the message from at least two participants within the time period, wherein the message comprises the orientation of the devices input value, and wherein the output comprises the goal completion.

Example 106

The computer-readable media according to Example 97, wherein the output device selection criteria is to be used during a runtime instance of the non-linear interactive program to select at least one of a coordinating device, wherein the coordinating device is to coordinate a runtime instance of the non-linear interactive program, a backup coordinating device, wherein the backup coordinating device is to coordinate the runtime instance of the non-linear interactive program when the coordinating device is unavailable, a purchaser, wherein the purchaser is to provide consideration to obtain the non-linear interactive program, a player, wherein the player is to play the runtime instance of the non-linear interactive program under the coordination of the coordinator, or a peripheral device.

Example 107

The computer-readable media according to Example 106, wherein the output device selection criteria comprises at least one of a random selection among a group of available output devices, a selection by the coordinating device or the backup coordinating device among the group of available output devices, a self-selection by a user of the output device, a selection of an output device based on at least one of a location of the output device, a display characteristic of the output device, a processing power of the output device, a goal completion status of a user of the output device, a participant role of a user of the output device, a battery life of the output device, an availability of non-battery power to the output device, an output device most recently added during the runtime instance of the non-linear interactive program, or an output device most heavily used during the runtime instance of the non-linear interactive program.

Example 108

The computer-readable media according to Example 107, wherein the participant role of the user of the output device comprises at least one of the coordinator, the purchaser, or the player.

Example 109

The computer-readable media according to Example 108, wherein the computer device is further to create the output device selection criteria to select the coordinator participant role during a runtime instance of the non-linear interactive program according to at least one of the self-selection criteria, the output device first or most recently added during the runtime instance of the non-linear interactive program, or the processor power of the output device.

Example 110

The computer-readable media according to Example 108, wherein the computer device is further to create the output device selection criteria comprising a set of player participant roles, each player participant role in the set comprising differing participant role output device selection criteria, wherein the set of all differing participant role output device selection criteria are used during the runtime instance of the non-linear interactive program to select output devices for the player participant roles.

Example 111

The computer-readable media according to Example 110, wherein the computer device is further to create a set of output and a set of input-output criteria, wherein output and input-output criteria are to be selected during the runtime instance of the non-linear interactive program at least in part according the selected output devices for the player participant roles.

Example 112

The computer-readable media according to Example 106, wherein the peripheral device comprises at least one of an audio and/or visual rendering device, an electronically or mechanically controlled lock, an electronically controlled actuator, or a communication device.

Example 113

One or more computer-readable media comprising instructions that cause a computer device, in response to execution of the instructions by a processor of the computer device, to: obtain access to and execute a non-linear interactive program, the non-linear interactive program comprising a set of action stages and an output device selection criteria, wherein each action stage in the set of action stages comprises an output, an input, and an input-output criteria; determine a set of output devices in an area according to the output device selection criteria; and receive the input, determine the output according to the input-output criteria, and output the output.

Example 114

The computer-readable media according to Example 113, wherein the output of an action stage in the set of action stages comprises at least one of a text, an image, an audio, a 2-dimensional print, 3-dimensional print, a peripheral device control, an executable software program, a deactivation of a player computer, a pause, or a goal completion.

Example 115

The computer-readable media according to Example 114, wherein the computer device is further to determine the goal completion in relation to a first action stage in the set of action stages and determine the output comprising an activation of a second action stage in the set of action stages.

Example 116

The computer-readable media according to Example 113, wherein the computer device is further to process the input, wherein the input of an action stage comprises at least one of a text input value, a voice input value, an image input value, a touch input value, an actuator input value, an orientation of device(s) input value, and a location input value.

Example 117

The computer-readable media according to Example 116, wherein the image input value comprises an image of a physical object, and wherein the computer device is further to process the image of the physical object to determine the image input value.

Example 118

The computer-readable media according to Example 117, wherein the physical object comprises at least one of a 2-dimensionally printed object, a 3-dimensionally printed object, a building, a person, an animal, or an object assembled during a runtime instance of the non-linear interactive program.

Example 119

The computer-readable media according to Example 118, wherein the 2-dimensionally printed object comprises at least one of a bar code, a matrix bar code, and a 2-dimensional print.

Example 120

The computer-readable media according to Example 113, wherein the computer device is further to determine the set of output devices in the area according to the output device selection criteria, receive a message comprising the input during the execution of the non-linear interactive program, and determine that the message was received from at least one participant proving the input within a time period, from a number of participants providing the input, or from a participant or a number of participants with a goal completion status in the non-linear interactive experience.

Example 121

The computer-readable media according to Example 120, wherein the input-output criteria of the action stage comprises the message from at least two participants within the time period, wherein the message comprises the orientation of the devices input value, and wherein the computer device is further to determine the output as comprising the goal completion and output the goal completion as the output.

Example 122

The computer-readable media according to Example 113, wherein the computer device is further to use the output device selection criteria to select at least one of a coordinating device, wherein the coordinating device is to coordinate execution of the non-linear interactive program, a backup coordinating device, wherein the backup coordinating device is to coordinate the execution of the non-linear interactive program when the coordinating device is unavailable, a purchaser, wherein the purchaser is to provide consideration to obtain the non-linear interactive program, a player, wherein the player is to play the non-linear interactive program under the coordination of the coordinator, or a peripheral device.

Example 123

The computer-readable media according to Example 122, wherein the output device selection criteria comprises at least one of a random selection among a group of available output devices, a selection by the coordinating device or the backup coordinating device among the group of available output devices, a self-selection by a user of the output device, a selection of an output device based on at least one of a location of the output device, a display characteristic of the output device, a processing power of the output device, a goal completion status of a user of the output device, a participant role of a user of the output device, a battery life of the output device, an availability of non-battery power to the output device, an output device most recently added during the execution of the non-linear interactive program, or an output device most heavily used during the execution of the non-linear interactive program.

Example 124

The computer-readable media according to Example 123, wherein the participant role of the user of the output device comprises at least one of the coordinator, the purchaser, or the player.

Example 125

The computer-readable media according to Example 124, wherein the computer device is further to use the output device selection criteria to select the coordinator participant role during the execution of the non-linear interactive program according to at least one of the self-selection criteria, the output device first or most recently added during the execution of the non-linear interactive program, or the processor power of the output device.

Example 126

The computer-readable media according to Example 124, wherein the output device selection criteria comprise a set of player participant roles, each player participant role in the set comprising differing participant role output device selection criteria, and wherein the computer device is further to use the set of all differing participant role output device selection criteria during the execution of the non-linear interactive program to select output devices for the player participant roles.

Example 127

The computer-readable media according to Example 126, wherein the computer device is further to select output and input-output criteria during the execution of the non-linear interactive program according to at least one of the output device selected for at least one of the player participant roles.

Example 128

The computer-readable media according to Example 122, wherein the peripheral device comprises at least one of an audio and/or visual rendering device, an electronically or mechanically controlled lock, an electronically controlled actuator, or a communication device.

The invention claimed is:
1. An apparatus for computing, comprising:
    means to perform an execution of a non-linear interactive program comprising means to obtain access to the non-linear interactive program comprising a set of action stages and an output device selection criteria, wherein each action stage in the set of action stages comprises an output, an input, and an input-output criteria; means to determine a set of output devices according to the output device selection criteria; means to receive the input, means to determine the output according to the input-output criteria, and means to output the output, and wherein:
    the input-output criteria of each action stage in the set of action stages comprises at least a first and a second message during a runtime instance of the non-linear interactive program received from a first and a second participant, respectively, within a time period, and the at least first message and second message each comprise the input or a sequence of the input; wherein means to determine the set of output devices in an area according to the output device selection criteria comprises means to receive the at least first and second messages and means to determine that the at least first and second messages were received from the first and second participants; and wherein the first and second messages comprise orientation of the devices' input values, and wherein the output comprises a goal completion status.

2. The apparatus according to claim 1, wherein: the output of an action stage in the set of action stages further comprises at least one of a text, an image, an audio, a 2-dimensional print, 3-dimensional print, a peripheral device control, an executable software program, a deactivation of a player computer, a pause, or a goal completion, and the input of the action stage further comprises at least one of a text input value, a voice input value, an image input value, a touch input value, an actuator input value, an orientation of the device(s)' input value, and a location input value.

3. The apparatus according to claim 1, further comprising means to determine the goal completion in relation to a first action stage in the set of action stages and means to determine the output further comprising an activation of a second action stage in the set of action stages during the execution of the non-linear interactive program.

4. The apparatus according to claim 2, wherein the image input value comprises an image of a physical object, and further comprising means to process the image of the physical object to determine the image input value, wherein the physical object comprises at least one of a 2-dimensionally printed object, a 3-dimensionally printed object, a building, a person, an animal, or an object assembled during a runtime instance of the non-linear interactive program, wherein the 2-dimensionally printed object comprises at least one of a bar code, a matrix bar code, and a 2-dimensional print.

5. The apparatus according to claim 1, further comprising means to use the output device selection criteria to select at least one of a coordinating device, wherein the coordinating device is to coordinate execution of the non-linear interactive program, a backup coordinating device, wherein the backup coordinating device is to coordinate the execution of the non-linear interactive program when the coordinating device is unavailable, a purchaser, wherein the purchaser is to provide consideration to obtain the non-linear interactive program, a player, wherein the player is to play the non-linear interactive program under the coordination of a coordinator, or a peripheral device, wherein the peripheral device comprises at least one of an audio and/or visual rendering device, an electronically or mechanically controlled lock, an electronically controlled actuator, or a communication device, and wherein the output device selection criteria further comprises at least one of a random selection among a group of available output devices, a selection by the coordinating device or the backup coordinating device among the group of available output devices, a self-selection by a user of the output device, a selection of an output device based on at least one of a location of the output device, a display characteristic of the output device, a processing power of the output device, a goal completion status of a user of the output device, a participant role of a user of the output device, a battery life of the output device, an availability of non-battery power to the output device, an output device most recently added during the execution of the non-linear interactive program, or an output device most heavily used during the execution of the non-linear interactive program, wherein the participant role of the user of the output device comprises at least one of the coordinator, the purchaser, or the player.

6. The apparatus according to claim 5, further comprising means to select output and input-output criteria during the execution of the non-linear interactive program according to at least one of the output device selected for at least one of the participant roles.

7. One or more non-transitory computer-readable media comprising instructions that cause a computer device, in response to execution of the instructions by a processor of the computer device, to:

obtain access to and execute a non-linear interactive program, the non-linear interactive program comprising a set of action stages and an output device selection criteria, wherein each action stage in the set of action stages comprises an output, an input, and an input-output criteria; determine a set of output devices in an area according to the output device selection criteria; and receive the input, determine the output according to the input-output criteria, and output the output, and wherein:

the input-output criteria of each action stage in the set of action stages comprises at least a first and a second message during a runtime instance of the non-linear interactive program received from a first and a second participant, respectively, within a time period, and the at least first message and second message each comprise the input or a sequence of input; wherein the first and second messages comprise orientation of the devices' input value, and wherein the computer device is further to determine the output as comprising a goal completion and output the goal completion as the output.

8. The computer-readable media according to claim 7, wherein the output of an action stage in the set of action stages further comprises at least one of a text, an image, an audio, a 2-dimensional print, 3-dimensional print, a peripheral device control, an executable software program, a deactivation of a player computer, a pause, or a goal completion, and wherein the computer device is further to process the input, wherein the input of the action stage further comprises at least one of a text input value, a voice input value, an image input value, a touch input value, an actuator input value, and a location input value.

9. The computer-readable media according to claim 8, wherein the computer device is further to determine the goal completion in relation to a first action stage in the set of action stages and determine the output further comprising an activation of a second action stage in the set of action stages.

10. The computer-readable media according to claim 8, wherein the image input value comprises an image of a physical object, and wherein the computer device is further to process the image of the physical object to determine the image input value, wherein the physical object comprises at least one of a 2-dimensionally printed object, a 3-dimensionally printed object, a building, a person, an animal, or an object assembled during a runtime instance of the non-linear interactive program, wherein the 2-dimensionally printed object comprises at least one of a bar code, a matrix bar code, and a 2-dimensional print, wherein the computer device is further to determine the set of output devices in the area according to the output device selection criteria.

11. The computer-readable media according to claim 7, wherein the computer device is further to use the output device selection criteria to select at least one of a coordinating device, wherein the coordinating device is to coordinate execution of the non-linear interactive program, a backup coordinating device, wherein the backup coordinating device is to coordinate the execution of the non-linear interactive program when the coordinating device is unavailable, a purchaser, wherein the purchaser is to provide consideration to obtain the non-linear interactive program, a player, wherein the player is to play the non-linear interactive program under the coordination of a coordinator, or a peripheral device, wherein the peripheral device comprises at least one of an audio and/or visual rendering device, an electronically or mechanically controlled lock, an electronically controlled actuator, or a communication device, and wherein the output device selection criteria further comprises at least one of a random selection among a group of available output devices, a selection by the coordinating device or the backup coordinating device among the group of available output devices, a self-selection by a user of the output device, a selection of an output device based on at least one of a location of the output device, a display characteristic of the output device, a processing power of the output device, a goal completion status of a user of the output device, a participant role of a user of the output device, a battery life of the output device, an availability of non-battery power to the output device, an output device most recently added during the execution of the non-linear interactive program, or an output device most heavily used during the execution of the non-linear interactive program, wherein the participant role of the user of the output device comprises at least one of the coordinator, the purchaser, or the player.

* * * * *